US009423538B2

(12) United States Patent
Tillotson et al.

(10) Patent No.: US 9,423,538 B2
(45) Date of Patent: Aug. 23, 2016

(54) RETROREFLECTIVE HEATER

(71) Applicant: The Boeing Company, Chicago, IL (US)

(72) Inventors: Brian J. Tillotson, Kent, WA (US); Zach J. Harris, Dallas, TX (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 13/900,066

(22) Filed: May 22, 2013

(65) Prior Publication Data

US 2014/0345967 A1    Nov. 27, 2014

(51) Int. Cl.
*G02B 5/136* (2006.01)
*G02B 5/124* (2006.01)
*E04B 1/90* (2006.01)
*E04B 1/76* (2006.01)
*E04B 1/84* (2006.01)

(52) U.S. Cl.
CPC .............. *G02B 5/136* (2013.01); *E04B 1/90* (2013.01); *G02B 5/124* (2013.01); *E04B 2001/7691* (2013.01); *E04B 2001/8414* (2013.01)

(58) Field of Classification Search
CPC .......... G02B 5/12; G02B 5/22; G02B 5/124; G02B 5/126; G02B 5/122; G02B 5/136; E04B 1/17; E04B 2001/7691; E04B 1/84; E04B 1/88

See application file for complete search history.

(56) References Cited

U.S. PATENT DOCUMENTS

| 3,220,871 | A | 11/1965 | Lemelson |
| 3,741,623 | A | 6/1973 | Mihalik |
| 4,160,577 | A | 7/1979 | Berg |
| 4,303,144 | A | 12/1981 | Wirt |
| 8,375,933 | B2 | 2/2013 | Myers |
| 2011/0170193 | A1 | 7/2011 | Budd et al. |
| 2011/0256350 | A1 | 10/2011 | Ito |
| 2012/0300306 | A1* | 11/2012 | Nagahama et al. .......... 359/601 |
| 2014/0347731 | A1 | 11/2014 | Tillotson et al. |

FOREIGN PATENT DOCUMENTS

| EP | 2397323 | 12/2011 |
| GB | 1575048 | 9/1980 |
| JP | 2006317648 | 11/2006 |
| JP | 2011221105 | 11/2011 |

(Continued)

OTHER PUBLICATIONS

Extended European Search Report, Patent Application No. 14161468.5 dated Oct. 15, 2014.

(Continued)

*Primary Examiner* — Bumsuk Won
*Assistant Examiner* — Ephrem Mebrahtu
(74) *Attorney, Agent, or Firm* — Kunzler Law Group, PC

(57) ABSTRACT

An apparatus for directing thermal infrared energy toward or away from a target is disclosed. The apparatus comprises a covering having a plurality of retroreflective elements. The plurality of retroreflective elements are configured to retroreflect electromagnetic beams primarily at thermal infrared wavelengths, receive the electromagnetic beams from the target along beam reception paths, and reflect the electromagnetic beams back toward the target along beam reflection paths. The beam reflection paths have substantially the same elevation angle and/or azimuth angle as their respective beam reception paths.

23 Claims, 20 Drawing Sheets

(56) References Cited

FOREIGN PATENT DOCUMENTS

| JP | 2012242509 | 12/2012 |
| NL | 8800294 | 9/1989 |
| WO | 2009094515 | 7/2009 |

OTHER PUBLICATIONS

Eckhardt, H, "Simple Model of Corner Reflector Phenomena," Appl. Opt. 10, 1559-1566 (1971).

Lou, Y., Wang, H., Liu, Q., Shi, Y., and He, S., "Analysis and Fabrication of Corner Cube Array Based on Laser Direct Writing Technology," Appl. Opt. 49, 5567-5574 (2010).

Spencer, R.C., "Optical Theory of the Corner Reflector," MIT Report 443, Mar. 1944.

Office Action from the Canadian Intellectual Property Office for Application No. 2,845,167 dated Apr. 27, 2015.

Extended European Search Report for Patent Application No. 14161459.4 dated Oct. 17, 2014.

Office Action for Canadian Patent Application No. 2,845,905 dated Mar. 26, 2015.

European Patent Office Examination Report for Application No. 14161459.4 dated Jul. 17, 2015.

European Patent Office Examination Report for Application No. 14161468.5 dated Jul. 21, 2015.

Office Action for Mexican Patent Application No. MX/a/2014/005465 dated Jul. 20, 2015.

Examination Report for European Application No. 14161468.5 dated Apr. 19, 2016.

Office Action for Canadian Application No. 2,845,167 dated Feb. 19, 2016.

Office Action for Canadian Application No. 2,845,905 dated Dec. 21, 2015.

\* cited by examiner

Figure 11

| | | |
|---|---|---|
| distance from panel to target (m) | Δx | 0.5 | 50 |
| mean width of target (m) | $W_T$ | 0.5 | 0.5 |
| peak wavelength (m) | λ | 9.60E-06 | 9.60E-06 |
| shortest noise wavelength (m) | λ_bad | 1.70E-02 | 1.70E-02 |
| Outputs | | | |
| minimum WR (m) | $W_{R\_min}$ | 1.17E-05 | 0.001171 |
| maximum WR (m) | $W_{R\_max}$ | 0.176777 | 0.176777 |
| maximum surface angle (rad) | θ_surface | 0.288675 | 0.002887 |
| maximum WR for noise (m) | $W_{R\_noise\_min}$ | 0.02074 | 2.074 |
| All minima < all maxima? | | TRUE | TRUE |

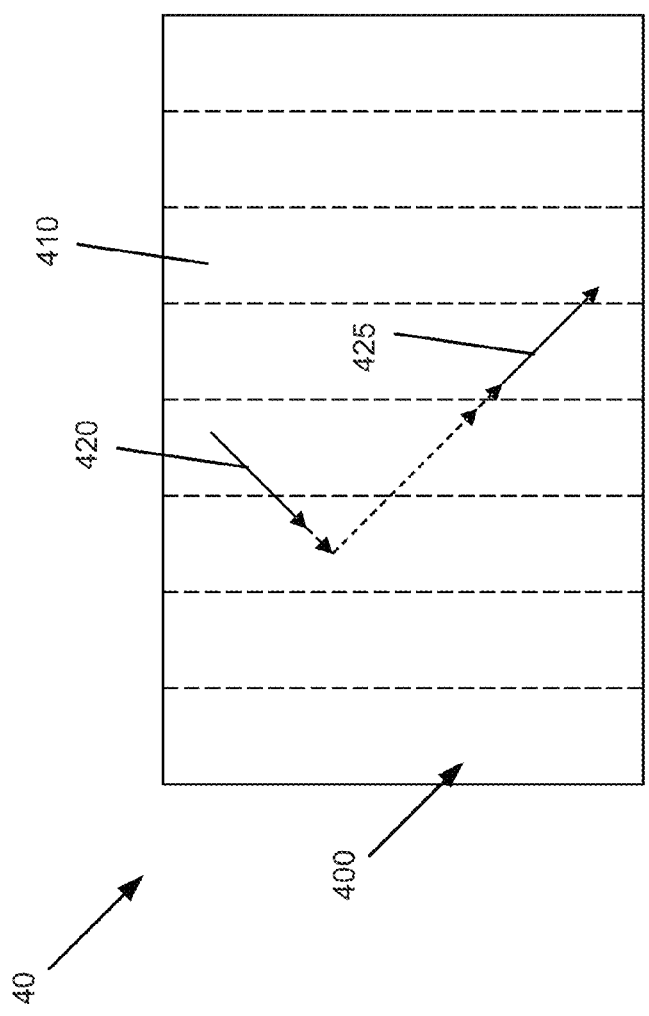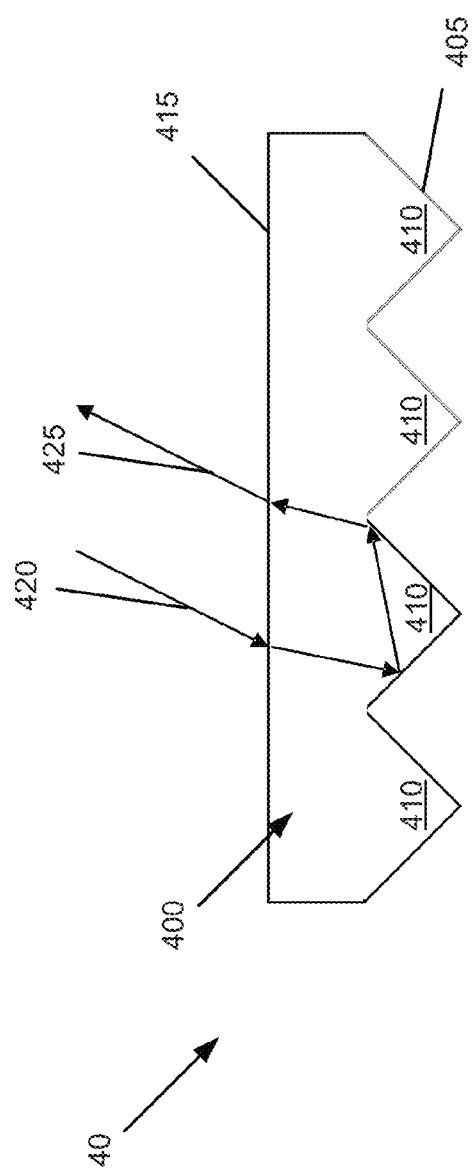

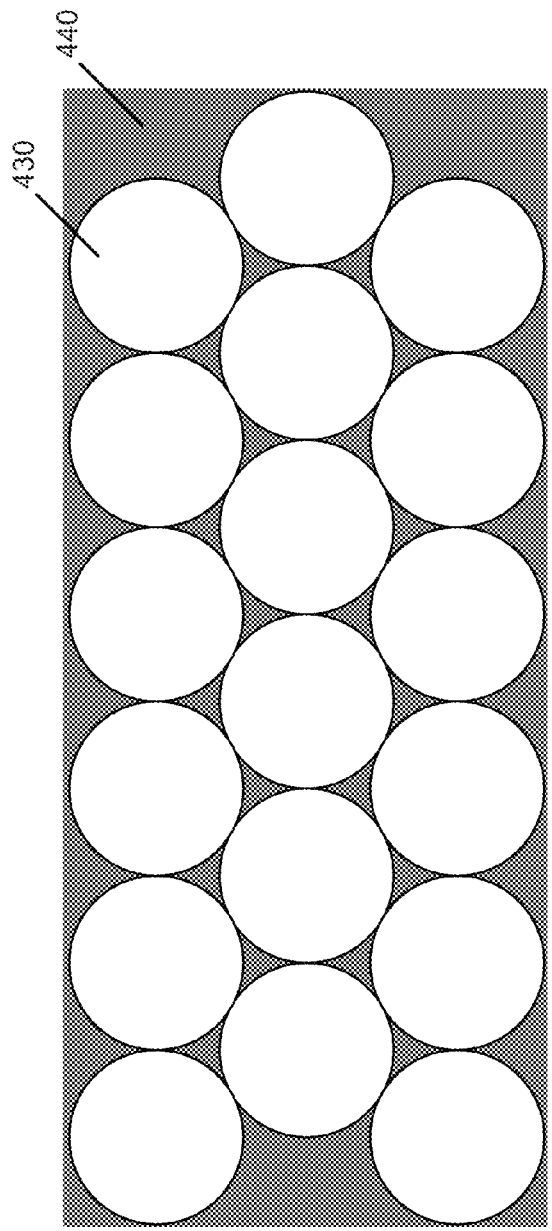
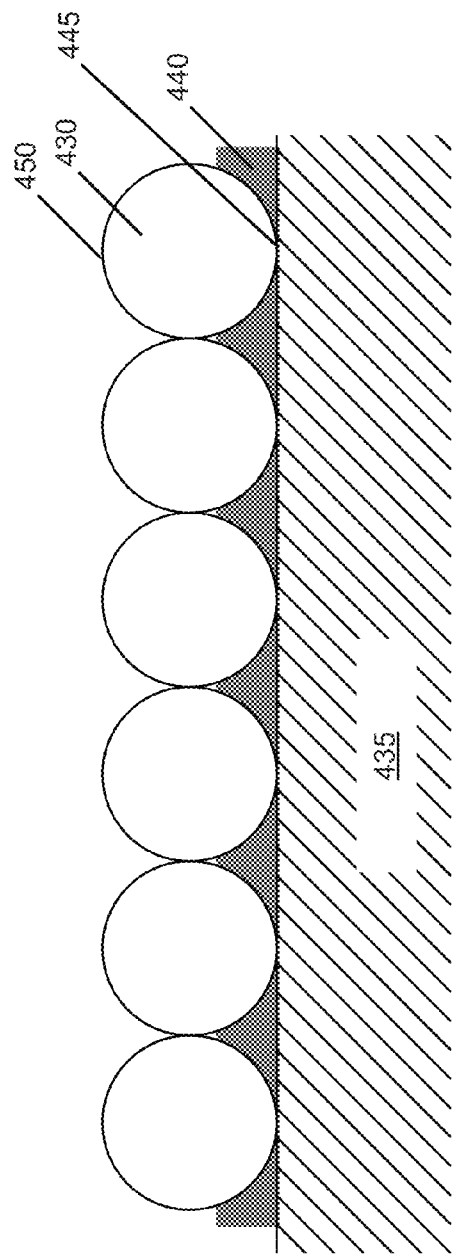
Figure 18A
Figure 18B

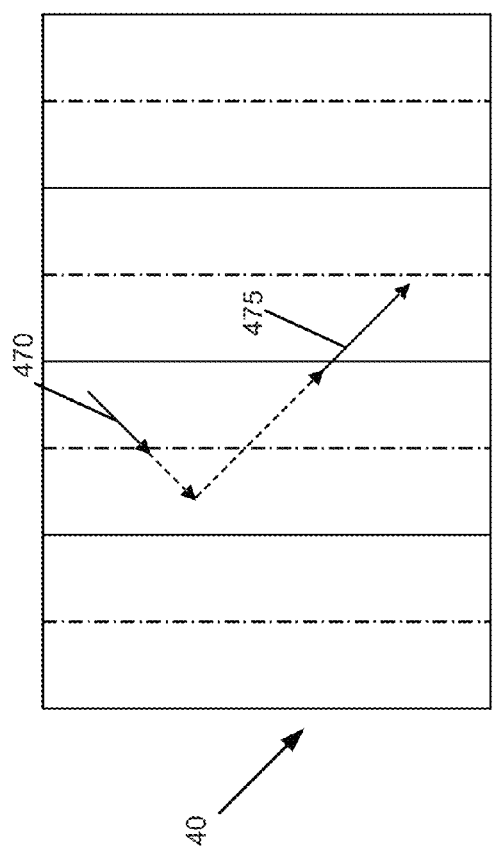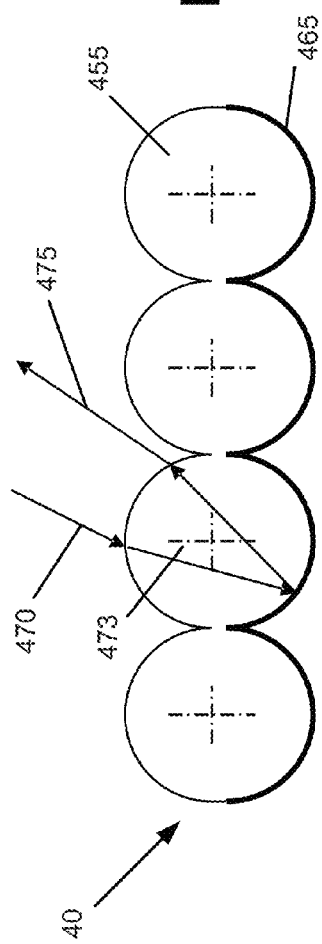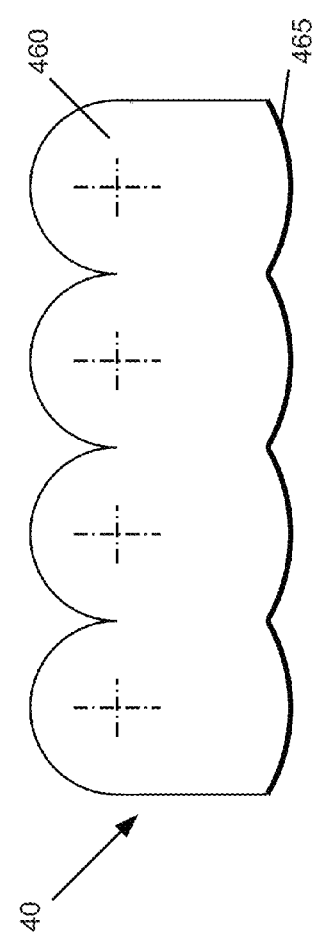

RETROREFLECTIVE HEATER

BACKGROUND

Maintaining the temperature of an object under a given set of environmental conditions may be difficult to achieve. Such temperature stability involves maintaining warm objects at a warm temperature and cold objects at a cold temperature. Further, temperature stability should be achieved efficiently and cost-effectively.

Temperature stability is desirable in a broad range of environments and situations. These include, for example and without limitation:

1) Keeping an individual, such as an airplane mechanic, comfortable and productive while working outdoors in cold winter weather or in hot summer weather;
2) Keeping an individual, such as a soldier or an airline passenger, comfortable during flight on an aircraft;
3) Keeping an engine or battery warm during a shutdown operation; and
4) Keeping an object, such as a roll of composite pre-preg, cold before use.

Generally stated, people and objects gain or lose heat through four mechanisms: conduction, convection, evaporation, and radiation. Approaches to maintain temperature stability often address one or more of these four mechanisms, and include, for example, without limitation:

1) Use of a convection heater, forced air heater, or air conditioner. These produce a stream of hot or cold air and reduce losses occurring through conduction and convection.
2) Use of insulation. This includes blankets of insulation on machines or in building walls, and can include a coat or mittens worn by people. This approach reduces losses occurring through conduction, convection, and, in some cases, radiation.
3) Shade. Whether natural or artificial, this blocks a source of radiant heat.
4) Use of a radiant heater. This produces radiant heat—typically infrared—and therefore heats by radiation.
5) Use of a "space blanket" or reflective insulation. When wrapped around a person or object, these reflect some of the infrared energy emitted by the person or object back to them. However, unless the insulation completely surrounds the person or object, the infrared reflection is minimally effective and most of the infrared energy is lost to the environment. Multilayer insulation (MLI) used on spacecraft is an example.
6) Combinations of the above. For example, jackets that contain battery-powered heaters or that include a reflective layer that utilizes specular reflection to return heat to the wearer.

There are instances in which wrapping a person or object with adequate insulation is not practical. Such cases include, for example:

1) An individual, such as a mechanic, working in cold weather but needing to use their fingers for fine work;
2) An individual, such as a mechanic, in cold weather having a repeated need to reach overhead in order to work, where the weight of a heavy coat would impede their ability to reach workpieces or otherwise cause repetitive stress injury;
3) An office worker in a cold office who needs their fingers free to type, as well as the need to be able to execute other fine motor skills; and
4) Machinery or material that must not get too cold in winter or too hot in sunlight while still allowing access for people to work on it.

Active heating/cooling systems are likewise not practical or optimal in many instances. For example, it may be necessary to place such systems very close to the individuals and objects to maintain their temperature stability. This limits the mobility of the individual and/or the accessibility or portability of the object.

SUMMARY

An apparatus for directing thermal infrared energy toward or away from a target is disclosed. The apparatus comprises a covering having a plurality of retroreflective elements. The plurality of retroreflective elements are configured to retroreflect electromagnetic beams primarily at thermal infrared wavelengths, receive the electromagnetic beams from the target along beam reception paths, and reflect the electromagnetic beams back toward the target along beam reflection paths. The beam reflection paths have substantially the same elevation angle and/or azimuth angle as their respective beam reception paths.

A method for directing thermal infrared energy toward or away from a target is also disclosed. The method comprises placing a covering at a mean distance $\Delta x$ with respect to the target. Electromagnetic beams are retroreflected from the covering primarily at thermal infrared wavelengths. The covering receives the electromagnetic beams along beam reception paths from the target and reflects the electromagnetic beams along beam reflection paths back to the target. The beam reflection paths have substantially the same elevation angles and/or azimuth angles as their respective beam reception paths.

The features, functions, and advantages that have been discussed can be achieved independently in various embodiments or may be combined in yet other embodiments further details of which can be seen with reference to the following description and drawings

BRIEF DESCRIPTION OF THE DRAWINGS

FIG. 11 is a table showing the dimensions and values for one example of a retroreflective infrared cover.

FIGS. 17A and 17B show a retroreflective infrared covering having retroreflective elements formed in the back surface of a sheet of infrared transparent material.

FIGS. 18A and 18B show a retroreflective infrared covering having retroreflective spheres of infrared transparent material.

FIGS. 19A, 19B, and 19C show retroreflective infrared coverings having refractive shapes at the front surfaces and reflective shapes at the back surfaces.

DETAILED DESCRIPTION

Every object emits thermal radiation in accordance with the Stefan-Boltzmann law, wherein the thermal radiance L in Watts/steradian/m² is proportional to the fourth power of temperature, T. Therefore, a given radiance corresponds to a given temperature, and when an object has a particular temperature T, it also has a particular radiance L. The radiative heat balance of an individual 10 (FIG. 1) may be estimated by the following equation:

$$P = e\sigma A(T_{skin}^4 - T_{env}^4)$$

where P is the radiative power released by the individual, e is emissivity, σ is the Stefan-Boltzmann constant, A is area (projected to a non-concave enclosing surface), $T_{skin}$ is skin temperature of the individual 10 with a corresponding radiance $L_{skin}$, and $T_{env}$ is the temperature of the environment 15 with a corresponding radiance $L_{env}$. Emissivity of human skin, e, at a skin temperature of, for example, 307° K, may be between about 0.9 and 0.98. An adult human may have, for example, a skin area in the range from about 1.24 m² to more than 2 m². Using 2 m² as an example area, the individual 10 radiates approximately 978 Watts. The individual 10 may absorb or emit radiant energy from/to the environment 15. For example, the net radiative heat balance may be positive, indicating that the individual 10 is losing heat to the environment 15. Alternatively, the net radiative heat balance may be negative, indicating that the individual 10 is gaining heat from the environment 15. In an exemplary office having a temperature of about $T_{env}$=296° K, the individual 10 absorbs 844 W. The individual 10 also gains or loses heat by conduction, convection, and evaporation/condensation. In such situations, however, as long as the total net heat balance is approximately 116 Watts for a sedentary adult (or a range from about 80 Watts for a sleeping adult to over 1000 Watts for an adult doing hard physical exercise), the individual 10 loses heat to the environment 15 about as fast as the individual's body metabolism produces it, and the individual 10 will feel neither too hot nor too cold.

Figure 1:
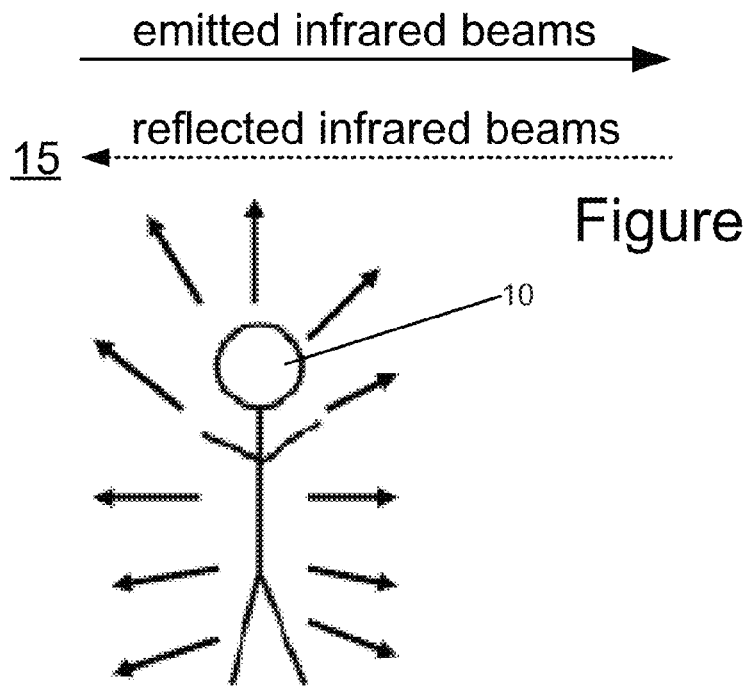
FIG. 1 illustrates an individual standing in a cold environment.

FIG. 1 illustrates the individual 10 standing in a cold environment 15, e.g. a flight line in winter. Heat escapes from the individual 10 to the adjacent air by conduction and convection. In addition, heat escapes from the individual 10 as beams of infrared radiation 17. If thinly clothed, the individual 10 will emit infrared radiation quickly and lose heat rapidly. Heat loss may be approximately 370 W in a freezing environment, where the temperature is, for example, $T_{env}$=273° K. A failure of the individual 10 to remain actively working will cause loss of finger mobility, slurred speech, and concentration difficulties. Accordingly, the individual will need a powerful heater or a thick coat, hat, and gloves, to stay warm and function properly in such conditions.

Figure 2:
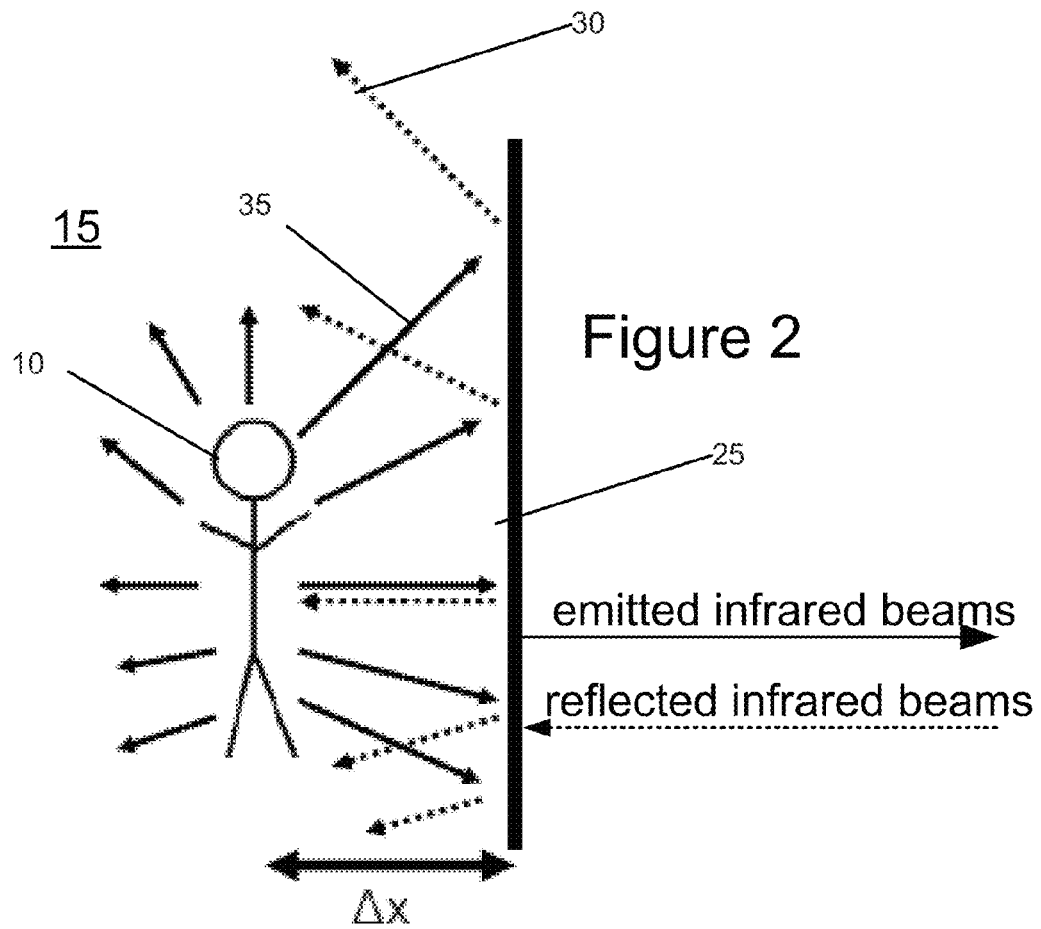
FIG. 2 illustrates an individual standing a distance $\Delta x$ from a surface that reflects infrared beams in a specular manner.

FIG. 2 illustrates the individual 10 standing a distance Δx from a surface 25 that reflects infrared beams 30 in a specular manner. The surface 25 may be, for example, the wall of a shed or other form of enclosure, such as one made from, for example, aluminum. The infrared beams 35 emitted from the individual 10 strike the surface 25 and specularly reflect from it. A small fraction of the infrared beams are reflected back to the individual 10, but a powerful heater will still be required to keep the individual 10 warm, though the amount of heat from the heater need not be as great as the situation shown in FIG. 1.

Figure 3:
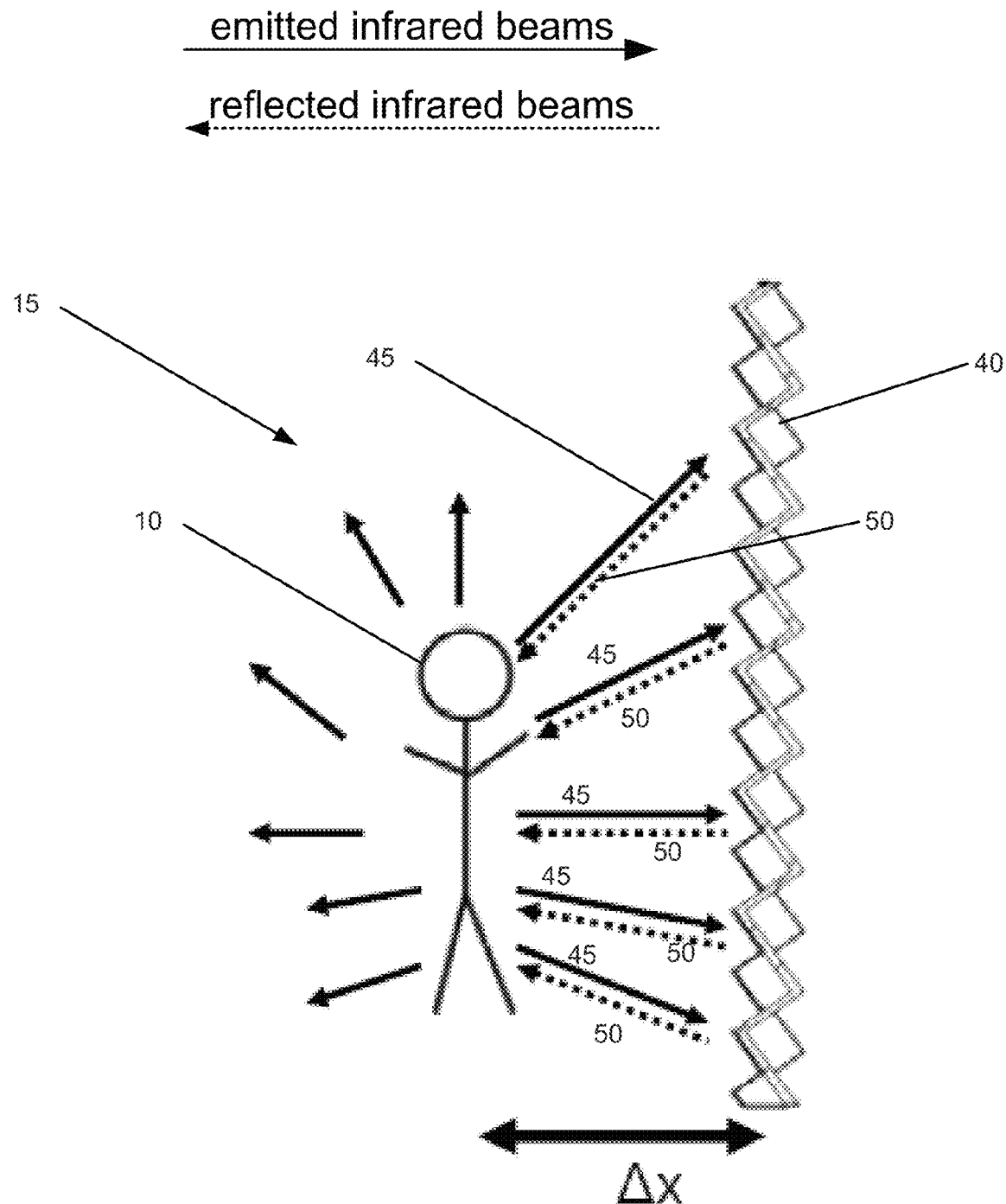
FIG. 3 illustrates one example of a retroreflective infrared covering applied to and/or forming at least a portion of a surface located proximate an individual.

In FIG. 3, a covering 40 is applied to and/or forms at least a portion of a surface located proximate the individual 10. Among others, the covering 40 may be in the form of a panel of the type that is used to construct a wall of an enclosure, or the like. In this example, the individual 10 stands a distance Δx from covering 40. Infrared beams are received from the individual 10 along beam reception paths 45 and strike the covering 40, where they are retroreflected as infrared beams along beam reflection paths 50. In the present examples, each beam reflection path 50 has an elevation angle that is substantially the same as the elevation angle of its respective beam reception path 45. The covering 40 may also be configured to retroreflect infrared beams in a manner where the azimuth angle of each beam reflection path 50 is substantially the same as the azimuth angle of the respective beam reception path 45. As a result, almost all of the infrared energy that strikes the covering 40 is directed back to the individual 10. However, it will be recognized that the covering 40 need not retroreflect all infrared energy in this manner so long as enough of the infrared energy is retroreflected to maintain the individual/target 10 at a desired temperature.

Figure 4:
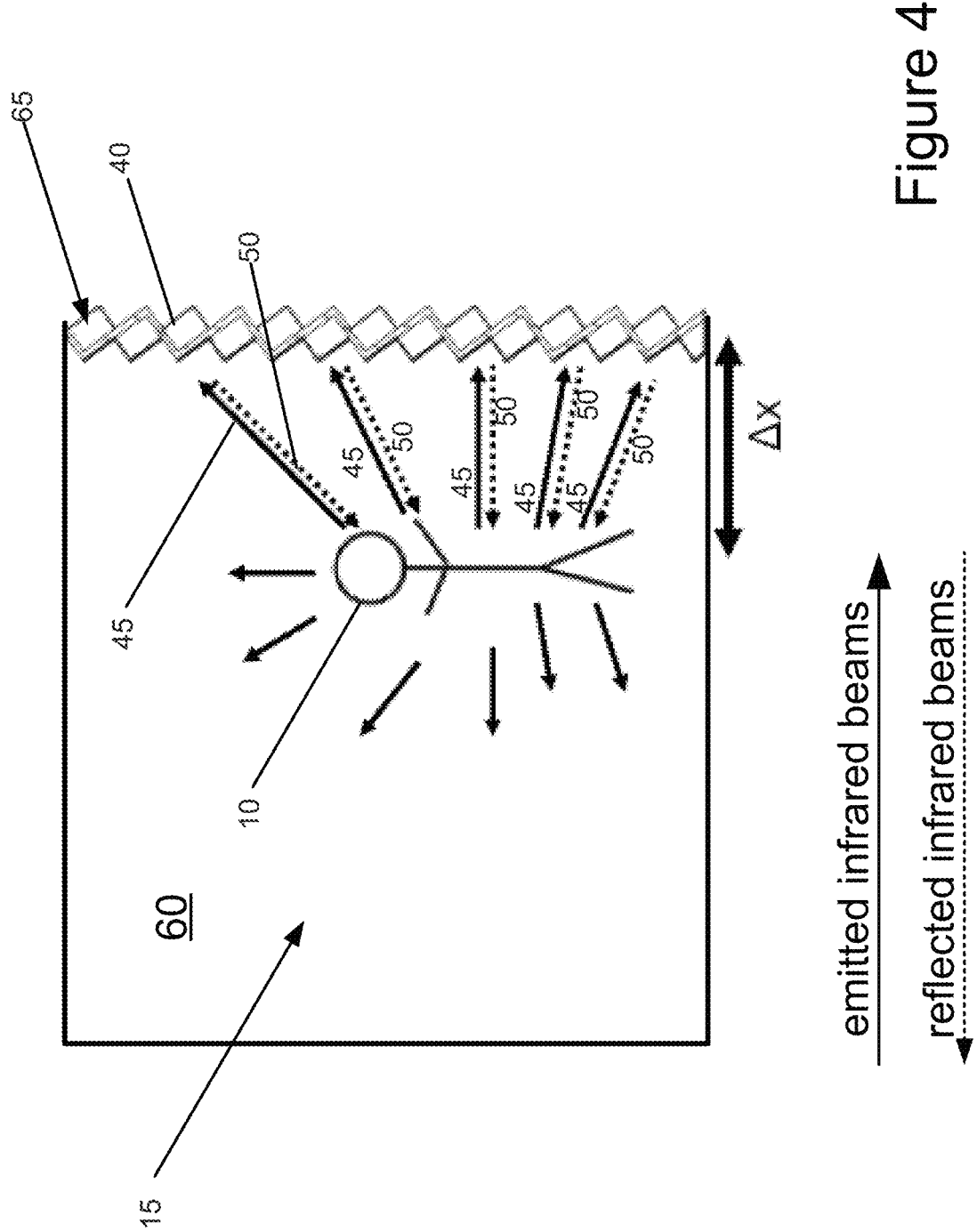
FIG. 4 shows an individual standing in a four-walled workspace where the surface of one wall includes a retroreflective infrared covering.

In the example shown in FIG. 4, the individual 10 is standing in a four-walled workspace 60 where the surface of one wall 65 includes covering 40. In this configuration, about ⅙ of the infrared energy emitted by the individual 10 is directed back from the covering 40 to the individual as retroreflected infrared energy.

Figure 5:
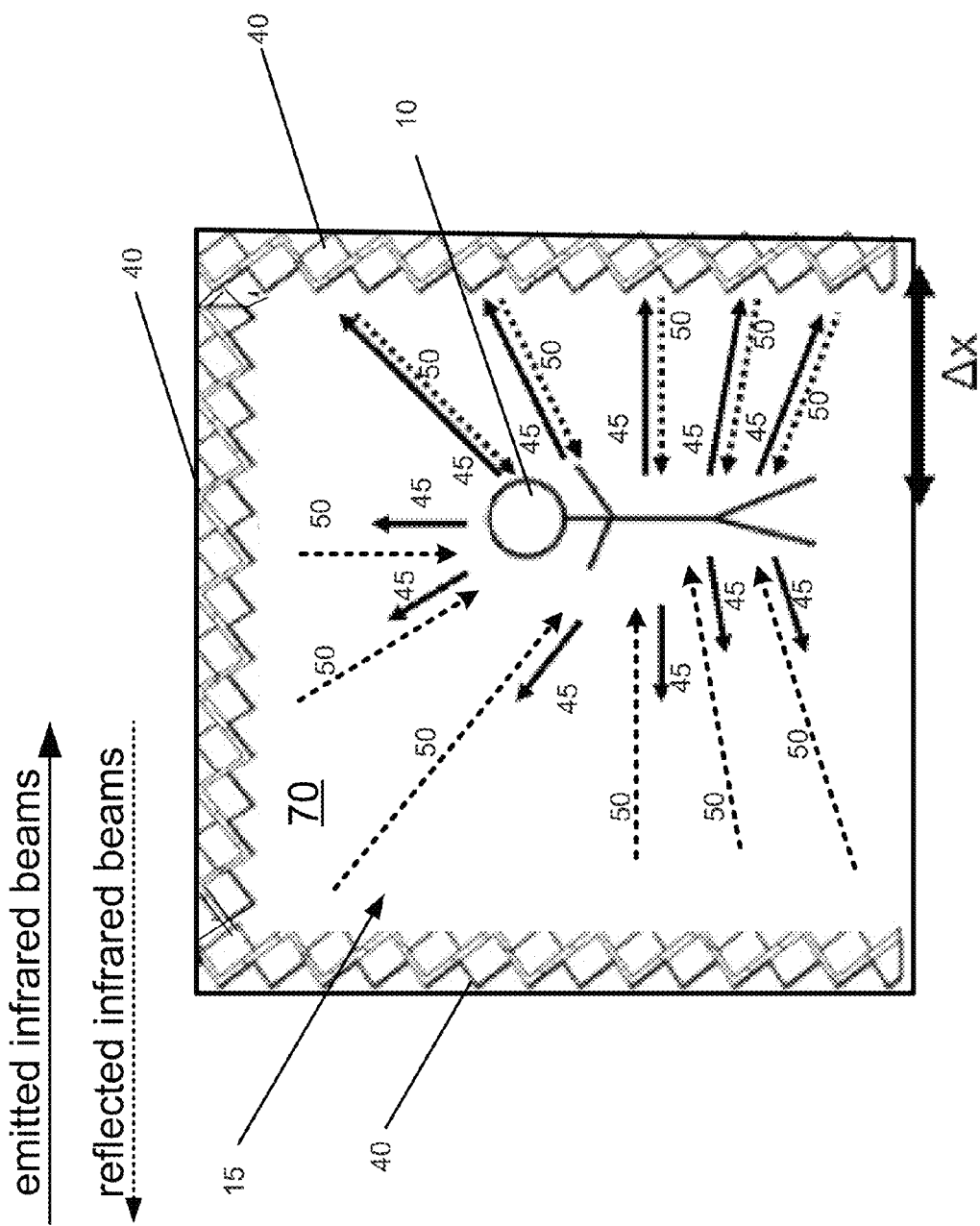
FIG. 5 shows an individual standing in a four-walled workspace, where all four walls and the ceiling have retroreflective infrared coverings.

In the example shown in FIG. 5, the individual 10 is standing in a four-walled workspace 70, where all four walls and the ceiling have coverings 40. In this configuration, almost all the infrared energy emitted by the individual 10 along beam reception paths 45 is retroreflected from coverings 40 to the individual 10 along beam reflection paths 50 as retroreflected infrared energy.

Assuming only 50% of the visible environment, for example, three walls and most of the ceiling have coverings 40, the environment of FIG. 5 may be modeled as 2π steradians of the 4π unit sphere. This situation results in unfavorable incidence angles, and, consequently, the coverings 40 return only about 50% of the infrared energy that reaches them from the individual 10. Under such conditions, only about 25% of the unit sphere actually retroreflects infrared radiation with radiance corresponding to $T_{skin}$ toward the individual 10. The other 75% of the unit sphere emits infrared radiation from the cold environment 15 (here, with radiance $L_{env}$ corresponding to the value of $T_{env}$) or scatters radiation from the cold environment 15 (with the same radiance corresponding to $T_{env}$). Therefore, the resulting radiative balance may be expressed as:

$$P=e\sigma A(T_{skin}^4-(0.25T_{skin}^4+(0.75T_{env}^4))=277\text{ W}$$

When compared to the same environment in which the individual loses, for example, 370 Watts without coverings 40, the individual 10 loses about 100 Watts less heat in the presence of coverings 40. Heating costs for the workspace 70, such as a factory, hangar, office, or the like can be reduced. In certain situations, one or more coverings 40 may eliminate the need for a heater, and/or the individual 10 may be free to wear lightweight clothing for a greater degree of mobility while working.

Figure 6A:
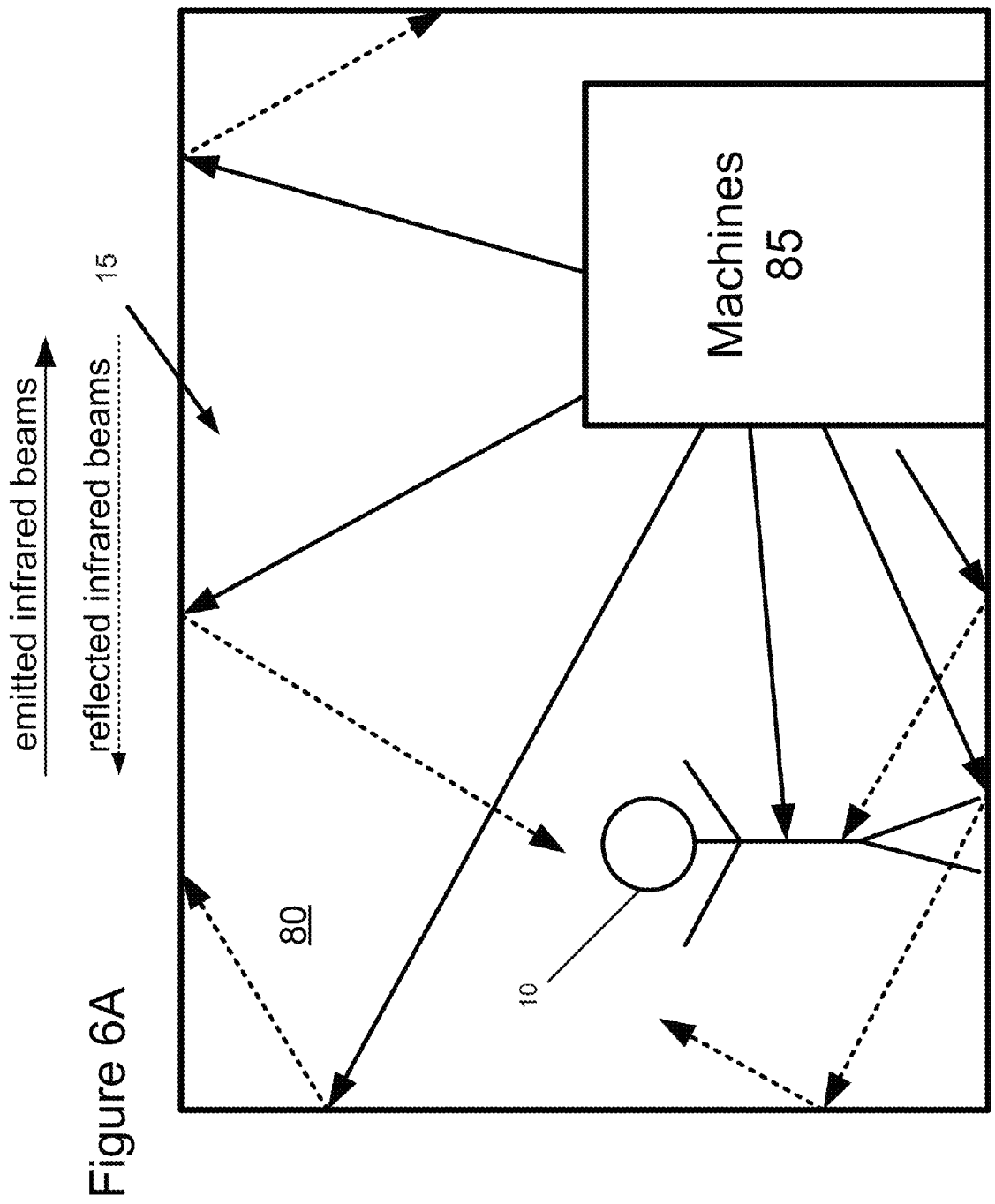
FIGS. 6A and 6B illustrate how the retroreflective infrared covering may be used in environments where it is desirable to keep a target, such as an individual or object cool.

A covering 40 may also be used in environments where it is desirable to keep a target, such as an individual or object, cool. With reference to FIG. 6A, it is assumed that the individual 10 is in a hot area of workspace 80, such as a factory, which does not include covering 40. In this example, machines 85 release heat in the form of thermal infrared energy to the environment 15, which raises $T_{env}$, for example, to a temperature of approximately 3380 K (i.e., 150° F.). Infrared energy from the machines 85 in this environment scatters and reflects from the walls, ceiling, and floor of the workspace 80 with a radiance corresponding to about 338 K. Even when an air conditioner is used to cool the air, a significant amount of infrared energy is absorbed by the individual 10. In this example, the net radiative balance may be approximately P=−459 W (assuming individual 10 has a skin area 2 m²), necessitating further steps to keep the individual 10 cool.

Figure 6B:
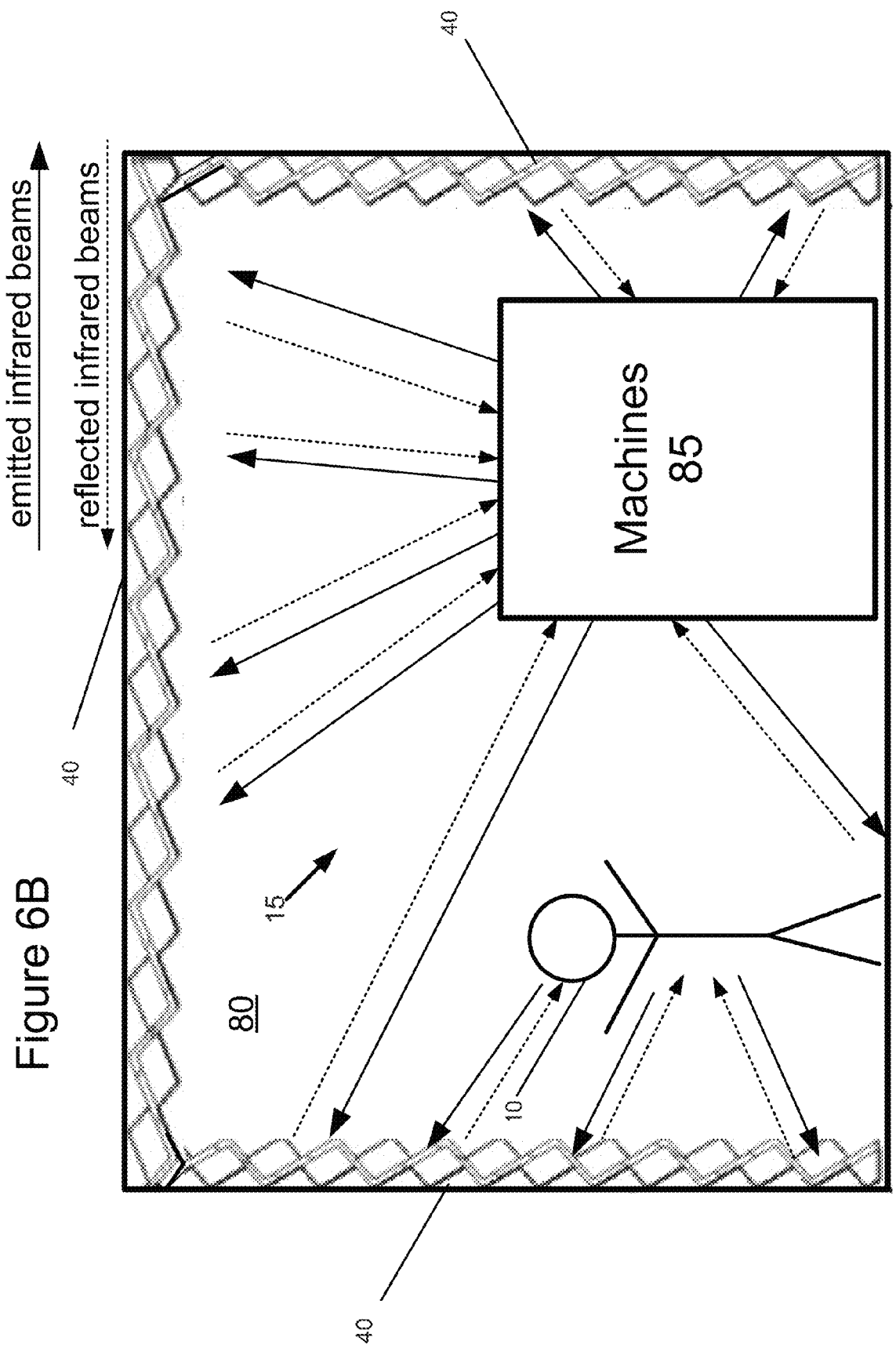

In FIG. 6B, the walls and ceiling of the workspace 80 incorporate coverings 40. Here, most of the thermal infrared energy emitted from the machines 85 strikes the coverings 40 and returns to the machines 85, rather than reflecting or scattering toward the individual 10 or increasing the temperature of the environment 15. Infrared energy from the individual's body strikes the coverings 40 and returns. Most of the thermal infrared energy reaching the individual 10 is, therefore, from the individual's body and has radiance corresponding to approximately to the individual's skin temperature, for example, $T_{skin}$=3070 K. Again, assuming the coverings 40 provide 50% coverage at 50% retroreflective efficiency, the net radiative balance of the individual 10 is approximately:

$$P=e\sigma A(T_{skin}^4-(0.25T_{skin}^4+0.75T_{env}^4))=-344\text{ W}$$

This result is an improvement of 100 Watts net radiative balance compared to the environment shown in FIG. 6A. A factory, hangar, or the like, can save on air-conditioning costs, and the individual 10 may be more productive and comfortable.

Figure 7:
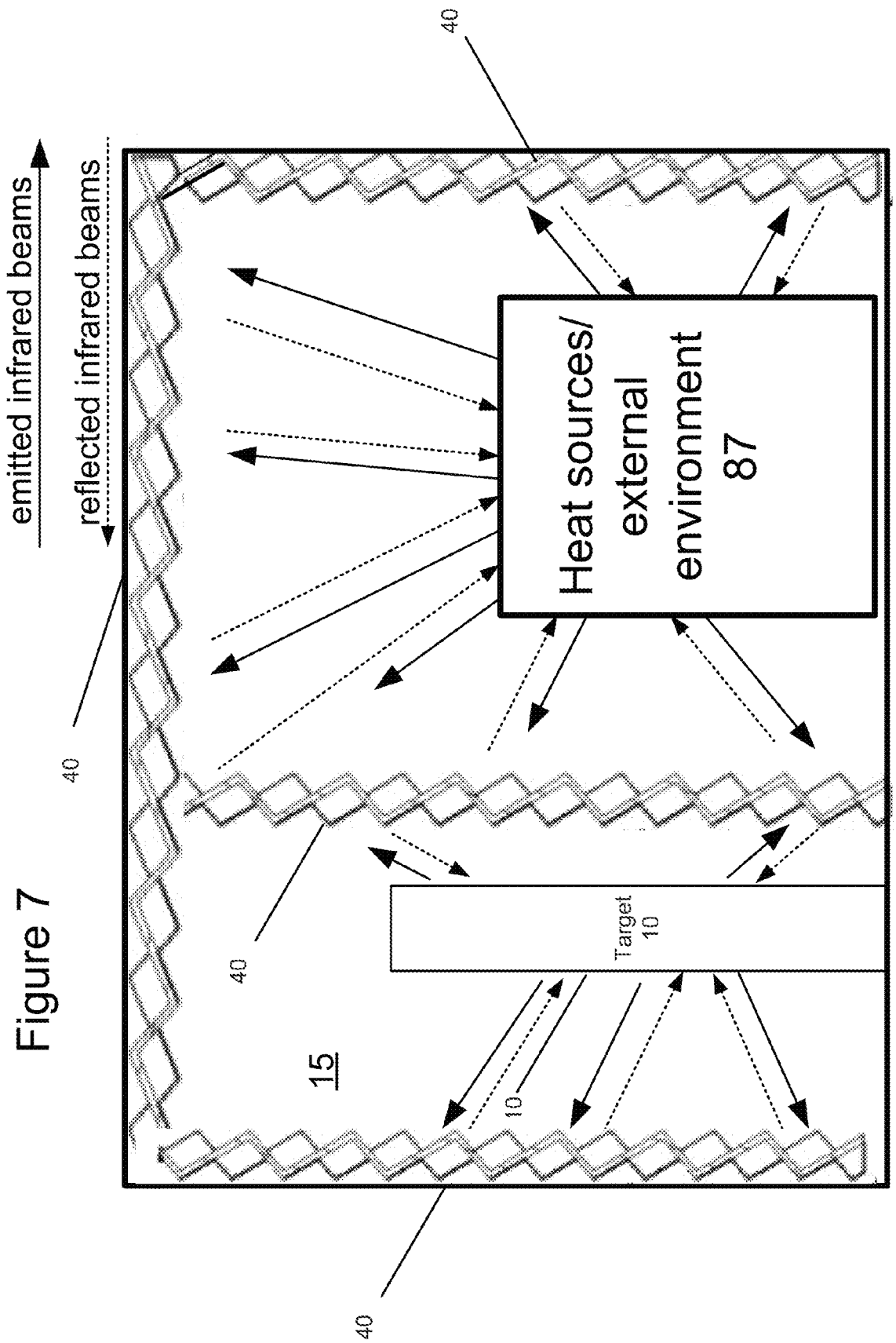
FIG. 7 illustrates a further example of how the retroreflective infrared covering may be used in environments where this desirable to keep a target cool.

FIG. 7 illustrates an environment in which a target 10 is to be cooled or remain cool. To this end, a further covering 40 is disposed between heat sources and/or ambient environment 87 and the target 10. Infrared energy from heat sources/external environment 87 is retroreflected back into the same environment and does not affect the radiance of infrared energy striking target 10 from the environment 15. The thermal infrared energy from target 10 is retroreflected by the coverings 40 back to the target, thereby limiting the radiance of infrared energy striking the target 10 principally to a radiance value corresponding to target 10's initial temperature (absent further heating of environment 15 by conduction through cover 40, convection, etc.). In another example, the coverings 40 surrounding the heat sources/external environment 87 may be eliminated, thereby limiting the use of coverings 40 to surfaces facing target 10.

The covering 40 may include a substrate, support structure, or the like that is covered, formed from, or embedded with a plurality of retroreflective elements. When the covering 40 is formed directly from the retroreflective elements, the retroreflective elements may be secured with one another without a substrate using a securement, a bonding process, or the like. As will be discussed below, the retroreflective elements may be constructed in a variety of different forms. However, they may have common characteristics such as:
1. Significant reflection of electromagnetic beams primarily at thermal infrared wavelengths, for example, in a range of wavelengths between about 700 nm-1 mm, and more preferably, for temperatures near typical human skin temperatures, wavelengths between about 8 microns and 12 microns;
2. Effective apertures that are large enough to return most of the reflected infrared beams back in the direction from which they were received, thereby limiting diffractive beam spread and/or side lobe reflections;
3. Effective apertures that are small enough to return most of the reflected infrared beams back to the object from which they were received, rather than lose the infrared energy of the infrared beams to reflective displacement;
4. Sufficiently high optical quality (e.g. flatness of surfaces) to return most of the reflected infrared beams back in the direction from which they were received, rather than lose the energy to scattering or aberrations; and
5. Effective apertures small enough to ensure that longer-wavelength energy, e.g. radio waves and/or audible sound waves, is lost to specular reflection or diffractive beam spread and side lobes.

For various applications, the covering 40 is large enough and close enough to the target object (e.g., object or individual), to subtend a solid angle of at least half a steradian (i.e., one eighth of the unit sphere) as viewed from the target object. This criterion may be used to set a lower limit on the size of the covering 40 in a given environment.

Figure 8:
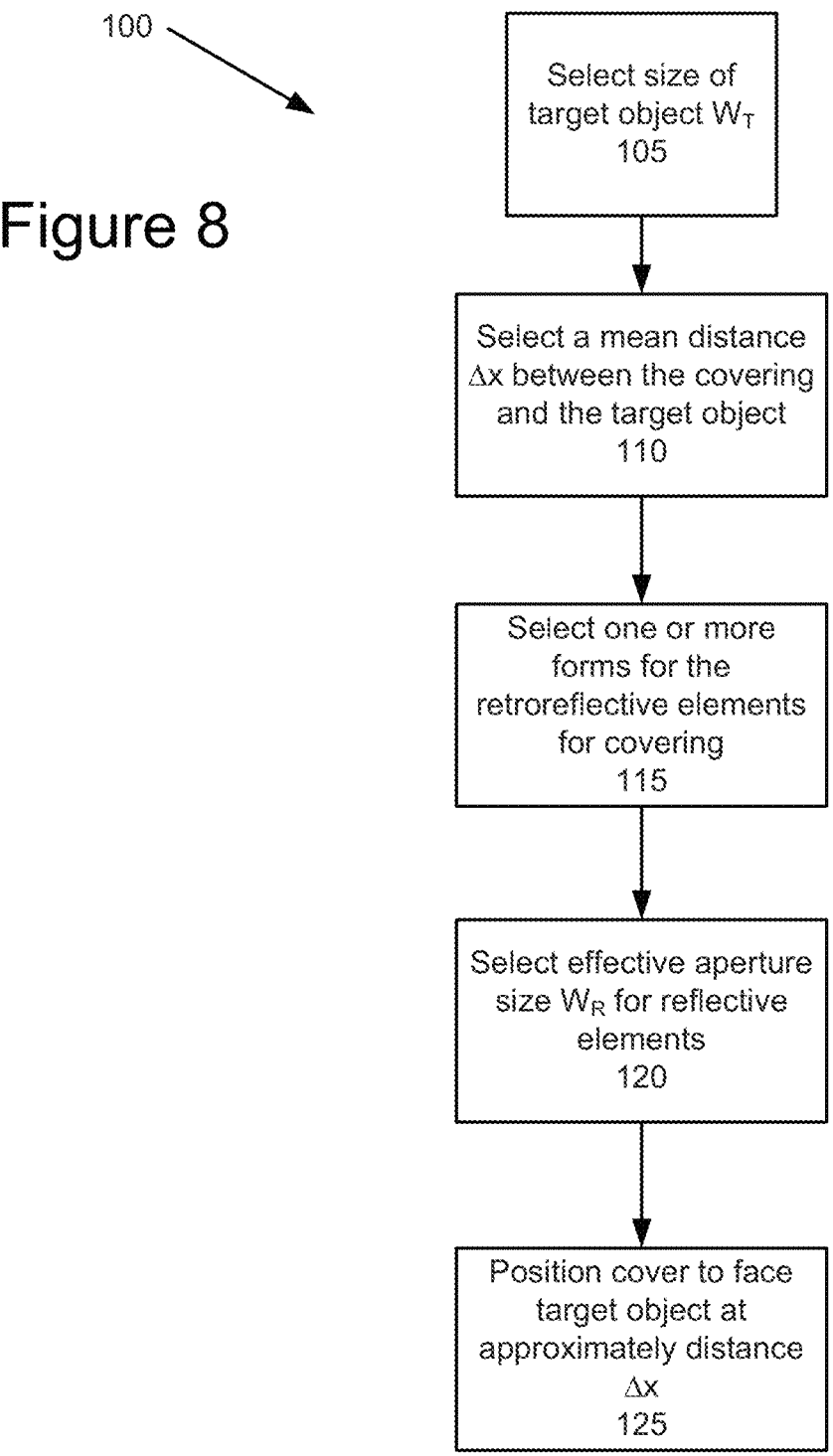
FIG. 8 illustrates a process for making and using an exemplary retroreflective infrared covering.

FIG. 8 illustrates a process 100 for making and using an exemplary covering 40. As shown, a size of target object $W_T$ is selected at operation 105. At operation 110, a distance Δx is selected for the mean distance between the covering 40 and the target object. If the temperature of the target is excessively hot or excessively cold, that temperature may also be incorporated in the process.

At operation 115, one or more of a variety of forms for the retroreflective elements is selected for the covering 40. The effective aperture size $W_R$ of each reflective element is chosen at operation 120 according to 1) a mean value for the target size $W_T$, 2) the mean value for the target distance Δx (operation 110), 3) the bounds imposed by diffraction requirements, and 4) the bounds imposed by reflective offset requirements. At operation 125, the covering 40 is, for example, mounted or otherwise disposed at or on a surface where it faces the target object at approximately the target distance Δx.

Figure 9:
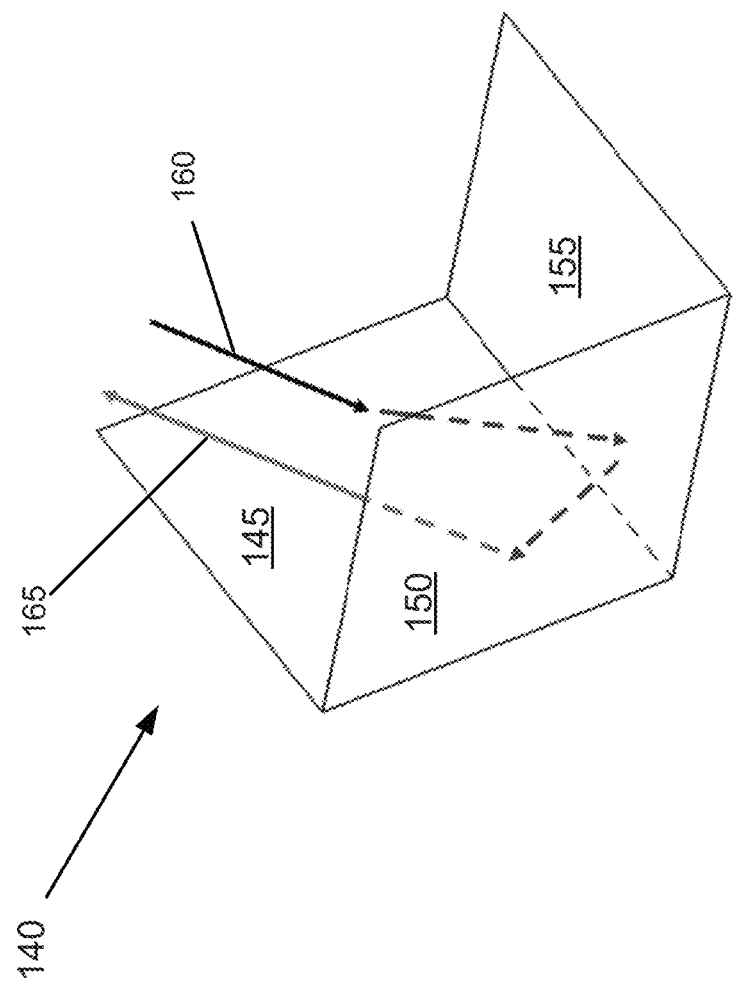
FIG. 9 shows a retroreflective element in the form of a corner cube reflector.

FIG. 9 shows a retroreflective element in the form of a corner cube reflector 140, a plurality of which may be used for the covering 40. The corner cube reflector 140 includes three mutually perpendicular reflective surfaces 145, 150, and 155. An arriving infrared beam enters the corner cube reflector 140 through an open face along a beam reception path 160. As shown, the infrared beam is reflected by the three surfaces 145, 150, and 155 before exiting the corner cube reflector 140 along the beam reflection path 165. The infrared beam exiting along the beam reflection path 165 has an elevation angle and/or azimuth angle that are substantially the same as the elevation angle and/or azimuth angle of the beam reception path 160 of the infrared beam. This allows the corner cube reflector 140 to return the thermal infrared energy that it receives back to the target from which it was received. In those instances where the beam reflection path 165 has both an elevation angle and an azimuth angle that is the same as the beam reception path 160, the reflection is completely anti-parallel and substantially all of the infrared beams received from the target are returned directly back to the target. Although FIG. 9 shows a single infrared beam and its respective beam reception path and beam reflection path, infrared beams received at the corner cube reflector 140 from multiple directions have respective beam reception paths and beam reflection paths with the same characteristics as FIG. 9.

If there is a single stationary target, the corner cube reflectors 140 may be disposed at different orientations, with each orientation chosen to maximize reflection back to the target. However, if there are multiple targets (e.g., a room full of people), or the single target is likely to move around, the corner cube reflectors 140 may be disposed at a common angle with respect to the wall for ease of manufacture and to provide a larger, though less efficient, region of retroreflection.

The corner cube reflector 140 may be designed so that it reflects infrared wavelengths principally in a range between about 700 nm-1 mm. Here, the corner cube reflector 140 is configured to reflect thermal infrared energy principally at wavelengths between about 8 microns and 12 microns. The reflective surfaces 145, 150, and 155 may be coated with copper, gold, silver, and/or aluminum as these materials do not have strong absorption resonances at thermal infrared wavelengths. Other coating materials having such characteristics are likewise suitable.

The thickness of the selected coating may be between, for example, three or four times the skin depth of the material at thermal infrared radiation wavelengths. Since skin depth of a material increases approximately with the square root of the infrared radiation wavelength, and thermal infrared wavelengths may be approximately 20 times greater than visible wavelengths, the coatings for a thermal infrared reflector are thicker than for coatings used by a visible or near infrared reflector.

In determining the dimensions of the corner cube reflector 140, diffraction should be minimized to ensure that the reflected infrared beams exit the corner cube reflector 140 at an elevation angle and/or azimuth angle that is parallel to, but in the opposite direction, of the infrared beam entering the corner cube reflector 140. Diffraction occurs when a collimated radiation beam passes through an aperture and spreads into a wider beam having an angle, $\theta_{diff}$, measured from the center of the beam to the first null. If the reflected infrared beam spreads too widely, then most of the reflected thermal infrared beams miss the target object. Assuming the distance between the corner cube reflector 140 and the target object is $\Delta x$, and diffraction spreads the reflected energy over an angle $2\theta_{diff}$, then the width $\Delta y$ of the infrared beam when it reaches the target is:

$$\Delta y = \Delta x\, 2 \sin\, \theta_{diff}$$
$$\approx \Delta x\, 2\theta_{diff} \text{ for small angles}$$

If the width $\Delta y$ is greater than about half the mean width $W_T$ of the target object, then most of the infrared radiation misses the target. The angular width of a diffracted beam (i.e., the difference between the angle at which the infrared beam enters the retroreflective element and the angle at which it exits the retroreflective element) increases with the ratio of the wavelength $\lambda$ to the aperture width of each individual retroreflector element. Thus to minimize diffraction, the aperture width should be sufficiently large relative to the wavelength $\lambda$.

Figure 10:
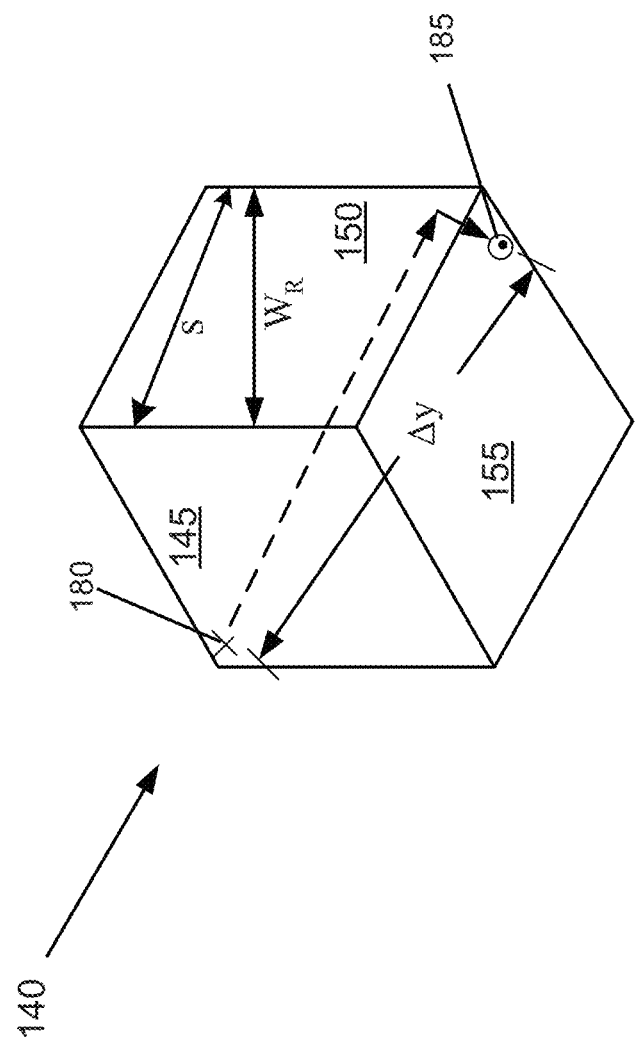
FIG. 10 is a front view of the corner cube reflector shown in FIG. 9.

FIG. 10 is a front view of the corner cube reflector 140, where the incoming infrared beam goes into corner cube reflector 140 at beam reception point 180 (perpendicularly into the page) and exits the corner cube reflector 140 at beam exit point 185 (perpendicularly out from the page). The corner cube reflector 140 includes a dimension $W_R$, which determines the effective aperture size of the corner cube reflector 140 with respect to an infrared beam having a wavelength $\lambda$ that travels successively between surfaces 145, 150, and 155. For a corner cube reflector 140 with square facets, $W_R$ has the following relationship with side length, s, for each facet:

$$s = \frac{2}{\sqrt{3}} W_R$$

Approximating the frontal shape of the corner cube reflector 140 as a circle corresponding to the effective aperture size $W_R$, the Airy diffraction formula may be used to define the lower bound of $W_R$ as:

$$W_R \geq 1.22 \frac{\lambda\, \Delta x}{W_T}$$

where $\lambda$ is in the range of infrared wavelengths, such as thermal infrared wavelengths. For example, $\lambda$ may be selected so that it is in a range centered about approximately 9.6 microns, the peak value of radiation from human skin. Using apertures approximating these dimensions, the spread of infrared beams due to diffraction is reduced thereby also increasing the amount of infrared energy returning to the target. These dimensions may be used, for example, to place a minimum bound for the effective aperture of the corner cube reflector 140. Apertures smaller than this may result in excessive diffraction, causing too much of the reflected infrared beam to spread out and miss the target.

Reflective offset may also result in reflected infrared beams missing the target. One example of reflective offset is illustrated in FIG. 10, which shows a triple bounce path of an infrared beam. In this example, the infrared beam enters the corner cube reflector 140 at a beam entry point 180, reflects from surfaces 145, 150, and 155, and departs at beam exit point 185. The mean reflective offset $\Delta y$ between a beam entering at a randomly selected beam entry point 180 and the beam exiting at beam exit point 185 may be approximated as:

$$\Delta y = W_R \sqrt{2}$$

If the average reflective offset $\Delta y$ is more than about half as wide as the mean target width $W_T$, then most of the reflected infrared beams will miss the target. To limit reflective offset, an upper bound may be placed on the effective aperture size so that:

$$W_R \leq \frac{W_T}{2\sqrt{2}}$$

For apertures larger than this, reflective offset of the infrared beams cause most of the retroreflected infrared energy to miss the target.

When a collimated infrared beam is reflected from a nominally flat surface, any deviation from flatness of the surface causes the beam to spread to a wider beam angle, $\theta_{error}$, measured from the nominal center of the reflected beam. If the reflected infrared beams spread too widely (e.g. about 2° off-center for a slim individual with their side exposed to the covering at a distance of about 2 meters, or about 20° off-center for a bulky individual face-on to the covering at a distance of about 1 meter), then much of the thermal energy of the reflected infrared beams miss the target. For example, if the distance from the corner cube reflector 140 to the target object is $\Delta x$ and surface errors spread the reflected energy over an angle $2\theta_{error}$, then the width $\Delta y_{spread}$ of the beam when it reaches the target may be approximated as:

$$\Delta y_{spread} = \Delta x \, 2 \sin(\theta_{error})$$
$$\approx \Delta x \, 2\theta_{error} \text{ for small angles}$$

If the width $\Delta y$ is greater than about half the mean width $W_T$ of the target, then most of the thermal energy of the reflected infrared beams misses the target. As such, the maximum acceptable value for $\theta_{error}$ is approximately:

$$\theta_{error} \leq \frac{W_T}{2\Delta x}$$

The total angular error $\theta_{error}$ for reflection from corner cube reflector 140 is the accumulated error of reflection from each of the three surfaces, $\theta_1$, $\theta_2$, and $\theta_3$. These errors are typically uncorrelated, so the total error is given by:

$$\theta_{error} = \sqrt{\theta_1^2 + \theta_2^2 + \theta_3^2}$$

Assuming each of the three surfaces is finished to the same flatness error, i.e., $\theta_{surface} = \theta_1 = \theta_2 = \theta_3$, then:

$$\theta_{error} = \sqrt{3\theta_{surface}^2}$$

As a result, the following equation may be used to set an upper bound on surface flatness error:

$$\theta_{surface} \leq \frac{W_T}{2\sqrt{3} \, \Delta x}$$

For surface errors larger than this, misalignment of the reflected infrared beam due to insufficient surface flatness causes most of the infrared energy to miss the target.

A retroreflective element can potentially reflect a wide range of undesirable radiation, such as radio wavelengths of electromagnetic energy and/or audible wavelengths of acoustic energy. For example, electromagnetic energy from a cell phone may be retroreflected back to a user and may add to the RF radiation that the phone already imparts to the person. This may cause discomfort and/or increase health risks associated with exposure to RF transmissions. Further, retroreflection of audible sound wavelengths, such as those of a voice, may result in echoes or reverberations of the sound that make it difficult for a person to speak and/or hear. Audible sound wavelengths are generally in a range from about 17 mm to 17 meters, while radio frequency waves of cell phones generally have wavelengths from about 1 cm to about 10 centimeters.

To render the retroreflector elements useful in a wide range of environments, they may be dimensioned to diffractively or specularly scatter electromagnetic radiation at these undesirable RF and audible sound wavelengths, rather than retroreflect them back to the target. Diffractive scattering occurs when the size of each retroreflective element is larger than about half a wavelength. Specular scattering occurs when each retroreflective element is smaller than about half a wavelength. However, any increase in the diffraction characteristics of the retroreflective element for radio frequency and/or audible sound wavelengths should be balanced against the constraints on the diffraction of the thermal infrared wavelengths. An exemplary minimum bound to reduce undesirable retroreflection may be set on the effective size of the aperture in accordance with the following equation:

$$W_R \leq \frac{1.22 \, \lambda_{bad} \, \Delta x}{W_T}$$

This is the inverse of the requirement to limit diffraction of the thermal infrared beams, so the same general formula is used, but with a "less than" symbol rather than "greater than" relationship. Here, $\lambda_{bad}$ generally corresponds to the range of wavelengths for which retroreflection is to be limited, $W_T$ generally corresponds to the mean width of the target, and $\Delta x$ corresponds to the mean distance that the target will be from the retroreflective element. In one example, the value for $\lambda_{bad}$ may be in a range from about 17 mm to 17 meters.

The dimensions and values used in one exemplary design of the cover 40 are shown in the table of FIG. 11. In this example, all of the effective aperture size criteria for the retroreflective elements of covering 40 are met with a single implementation that may be used in multiple environments. The covering design of FIG. 11 may be used in very short range environments, where $\Delta x$ is approximately 0.5 m so that the covering 40 is in close proximity to the target. The same covering design may be used in a long range environment, where $\Delta x$ is approximately 50 m, so that the cover 40 and target are separated from one another by a considerable distance.

For applications aimed at keeping individual people comfortable and productive, the mean target width, $W_T$, generally will not vary much from 0.5 meter. Assuming that $W_T$ is considered as a constant, the reflective offset criterion limits $W_R$ to typically not be greater than 17 cm for all values of $\Delta x$. The audible sound scattering criterion, however, imposes a more significant constraint at values of $\Delta x$ around approximately 0.5 m (i.e. short range), where $W_R$ is no greater than 2 cm in the present example. This upper bound for $W_R$ in the example is above the lower bound of 1.2 mm set by the diffractive spreading criterion at $\Delta x$ that occurs at approximately 50 m (i.e. long range), so $W_R$ values between 1.2 mm and 2 cm are acceptable over the full range of Δx values. The maximum surface angle error in this example is approximately 2.9 milliradians when Δx is approximately 50 m. This value for the surface error corresponds to a manufacturing tolerance of about 0.058 mm (~2 mils) over the width of a reflective facet. For most office and factory applications, however, such long range performance is not needed, so a larger surface angle error may be acceptable.

The minimum $W_R$ value used in the example of FIG. 11 is slightly over 1 mm, even for a 50 meter target distance. For office-scale uses, where the targets are much closer than 50 meters, the texture of the front surface of the covering 40 can be as fine as fabric used on cubicle walls and finer than the stucco pattern on some walls and ceilings. This allows the covering 40 to be constructed so that it has an aesthetically appealing appearance for office and residential use.

Figure 12:
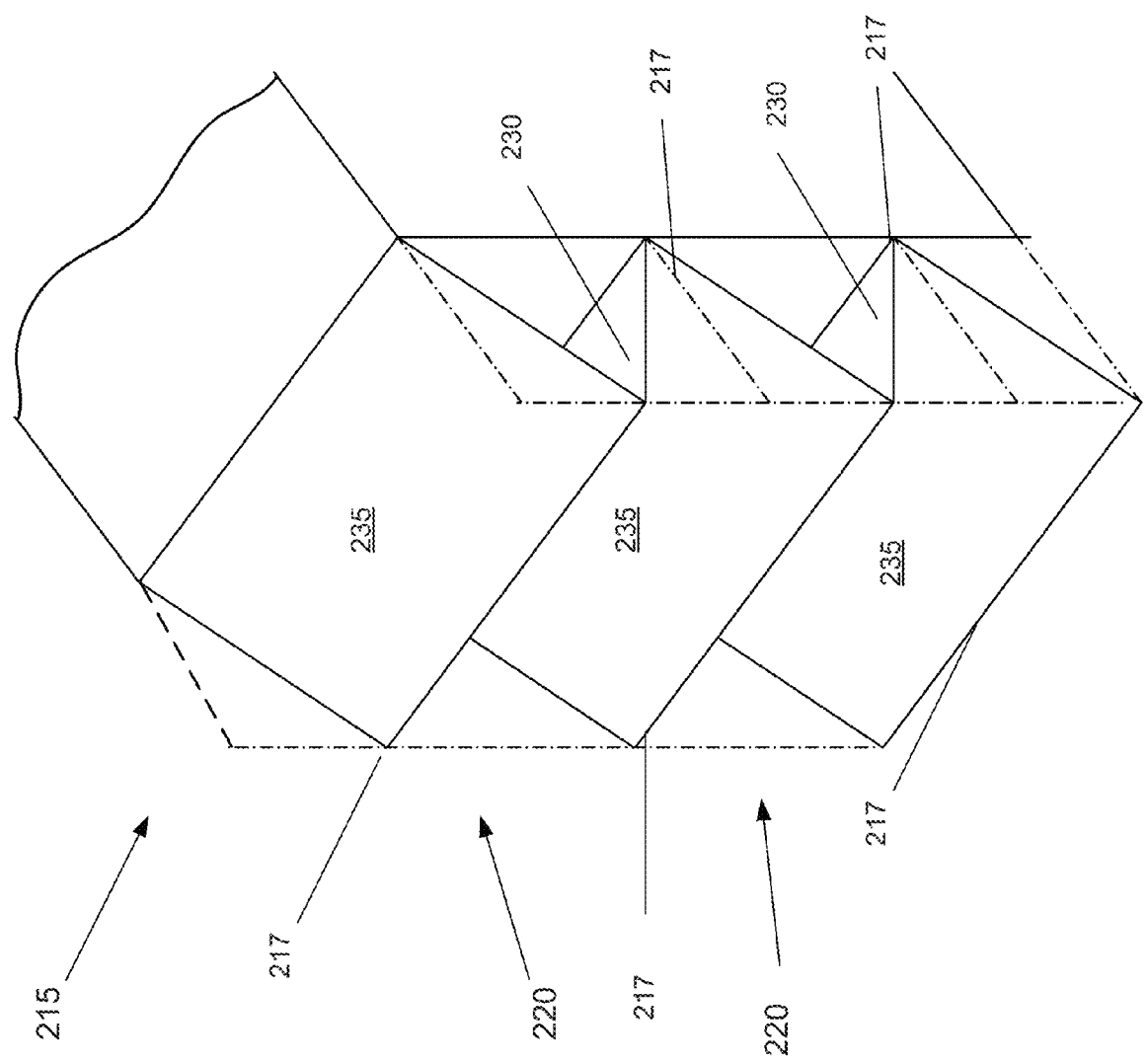
FIGS. 12 and 13 show a retroreflective infrared covering in the form of a trough reflector comprised of a plurality of horizontal troughs.
Figure 13:
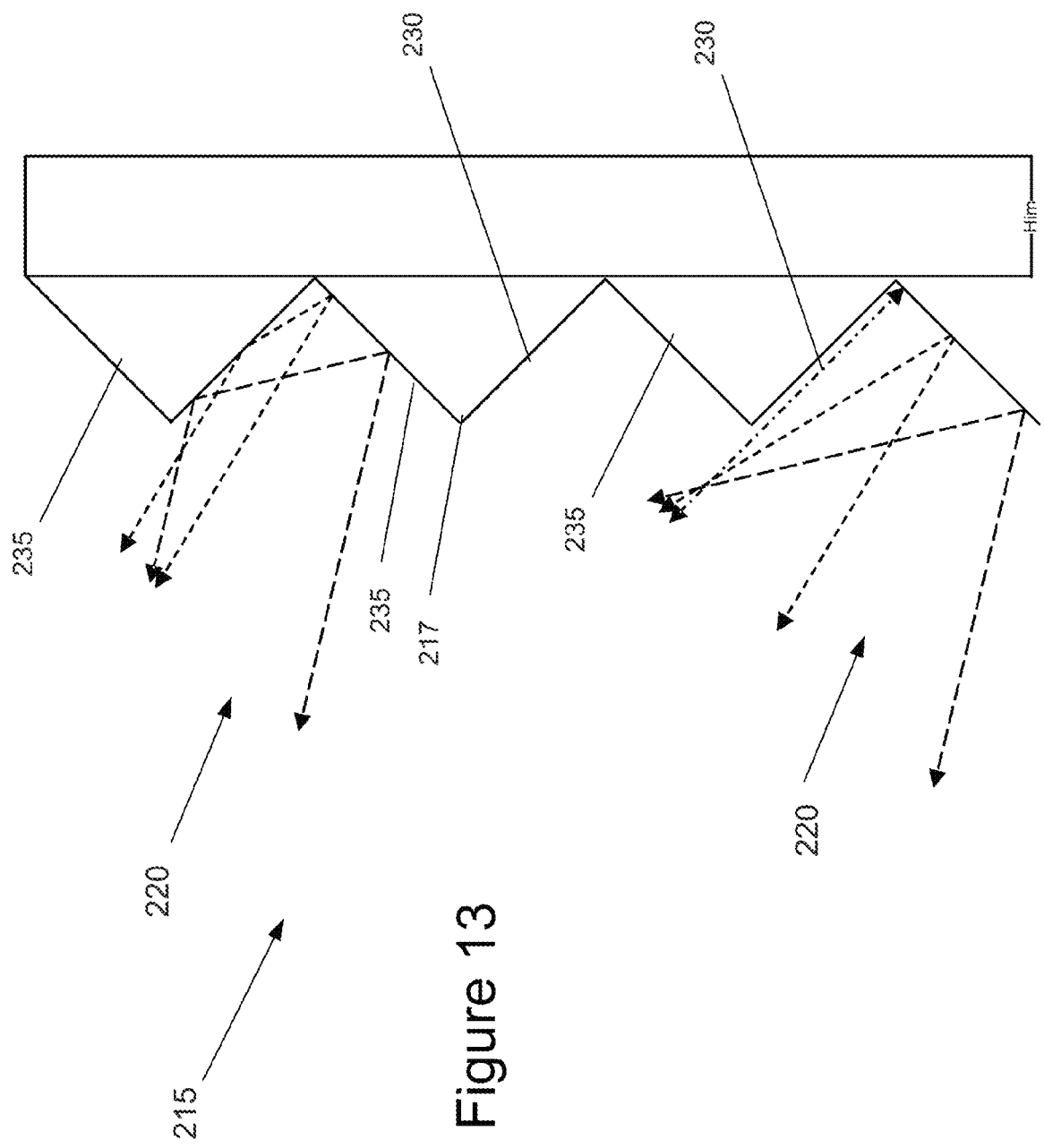

FIGS. 12 and 13 show a covering in the form of a trough reflector 215 comprised of a plurality of horizontal troughs 220. The horizontal troughs 220 are arranged to reflect infrared beams along a path having the same elevation angle at which the infrared beams enter the horizontal trough 220. However, depending on the arrangement, such horizontal troughs 220 may reflect the received infrared beams at an azimuth angle that is different from the azimuth angle at which the infrared beams enter the horizontal trough 220. Nevertheless, returning the reflected infrared beams at the same elevation angle as the elevation angle at which the infrared beams are received still increases thermal infrared heating of the target. This may give sufficient performance for applications with narrow, horizontally-oriented targets, such as patients lying in a hospital or soldiers sleeping in a tent within a few body lengths of trough reflector 215. The trough reflector 215 may also be arranged so that the troughs are vertical as opposed to horizontal. In this arrangement, the received infrared beams are returned at the same elevation angle as the elevation angle at which the infrared beams are received, while the azimuth angles of the reflected infrared beams are the reflex of the azimuth angles of the received infrared beams. This may give sufficient performance for applications with narrow, vertically-oriented targets, such as people standing upright at a worksite or bus stop. The trough reflector 215 may also be arranged so that the troughs are oriented at any angle between horizontal and vertical, depending on the application.

The horizontal troughs 220 of FIGS. 12 and 13 each include a set of alternating perpendicular faces. In the illustrated example, each horizontal trough 220 has two faces 230 and 235 of equal size. Each face 230 and 235 may be oriented at 45° For a typical close-range human comfort application, range could be 35° to 55° from horizontal, one with its reflective surface upward, and the other with its reflective surface downward. The horizontal troughs 220 may be further oriented so that faces 230 and 235 may be readily cleaned.

As shown in FIG. 13, reflections may be single reflections or double reflections depending on the elevation angle and the location of the received infrared beam. In the case of double reflections, such as the reflections shown at the top of FIG. 13, infrared beams leave the horizontal trough 220 as reflected infrared beams at the same elevation angle at which the infrared beams are received from the target. In the case of single reflections, such as the reflections shown in the lower portion of FIG. 13, infrared beams leave the horizontal trough 220 as reflected infrared beams at a different azimuth angle than the azimuth angle at which the infrared beams are received from the target. However, returning a portion of the infrared beams at the same elevation is still an improvement over environments in which infrared beams are not retroreflected in such a manner back to the target. It should be noted that all infrared beam paths shown in FIG. 13 are bidirectional, i.e., infrared beams can arrive along either path and depart on the other. Consequently, each path is illustrated with an arrowhead at each end.

The plurality of the horizontal troughs 220 may be bendable about their respective horizontal centerlines 217 to allow folding of the trough reflector 215, or portions thereof, for portability. Folding of the trough reflector 215 may be desirable, since the trough reflector 215 may include dozens or even hundreds of individual horizontal troughs 220 that may be folded over one another.

Figure 14:
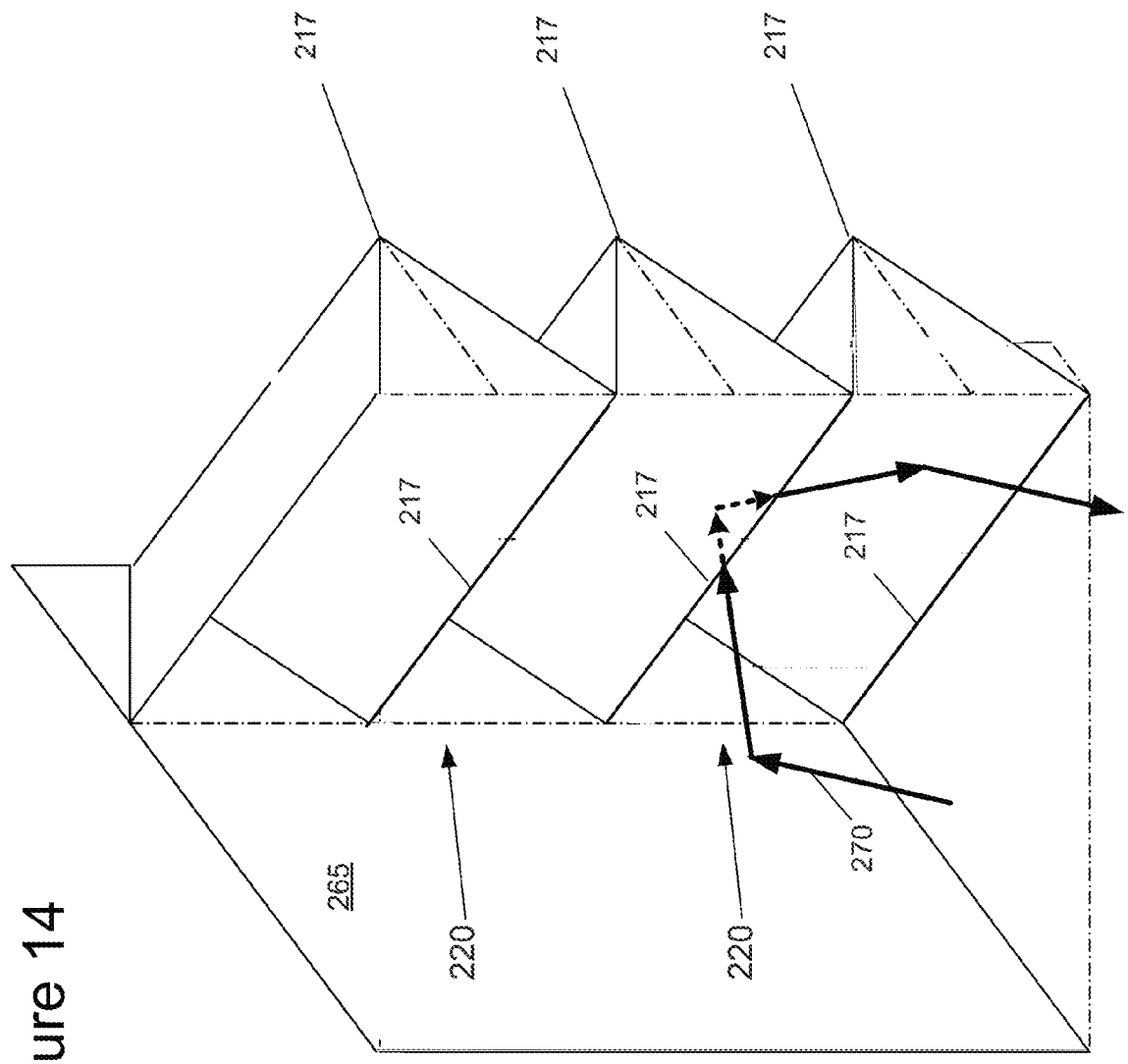
FIG. 14 shows a modified version of the retroreflective infrared covering shown in FIGS. 12 and 13.

FIG. 14 shows a modified version of the covering shown in FIGS. 12 and 13. Unlike the examples shown in FIGS. 12 and 13, the example of FIG. 14 includes a reflective wall 265 disposed adjacent the plurality of horizontal troughs 220. A plurality of reflective walls 265 may be disposed along a length of the covering to vertically divide the horizontal troughs 220 into multiple columns. Further, a plurality of reflective walls 265 may horizontally separate different pluralities of horizontal troughs 220. As shown by arrows 270, the elevation angle as well as the azimuth angle of the exiting infrared rays are both generally the same as, but in an opposite direction to the elevation angle and azimuth angle, the entering infrared rays when one or more reflective walls 265 are used. Again, various design criteria set forth above may be used as guidelines to determine the dimensions of the plurality of horizontal troughs 220 and their relationship with each reflective wall 265.

Figure 15:
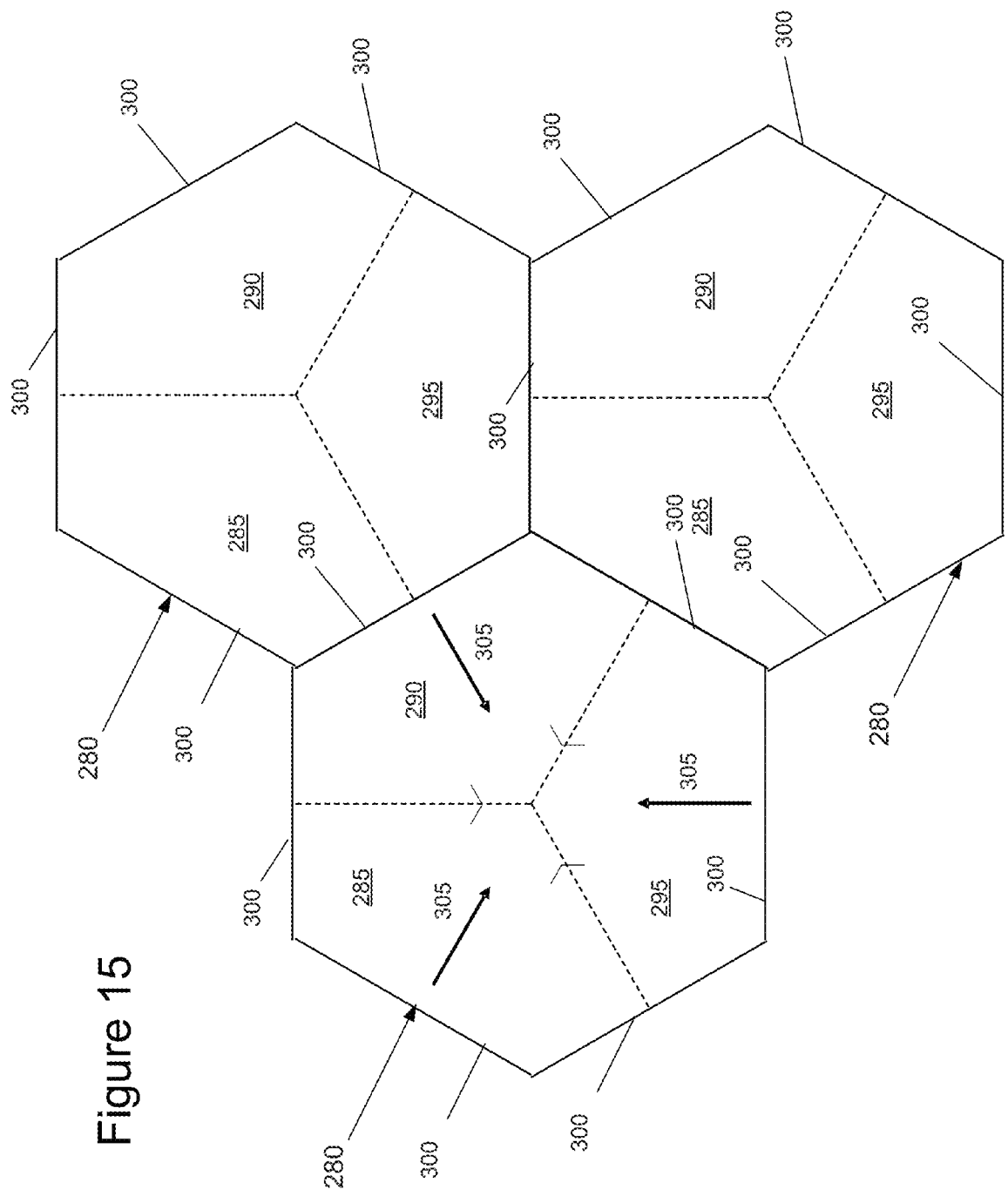
FIGS. 15 and 16 show other corner cube reflector forms.
Figure 16:
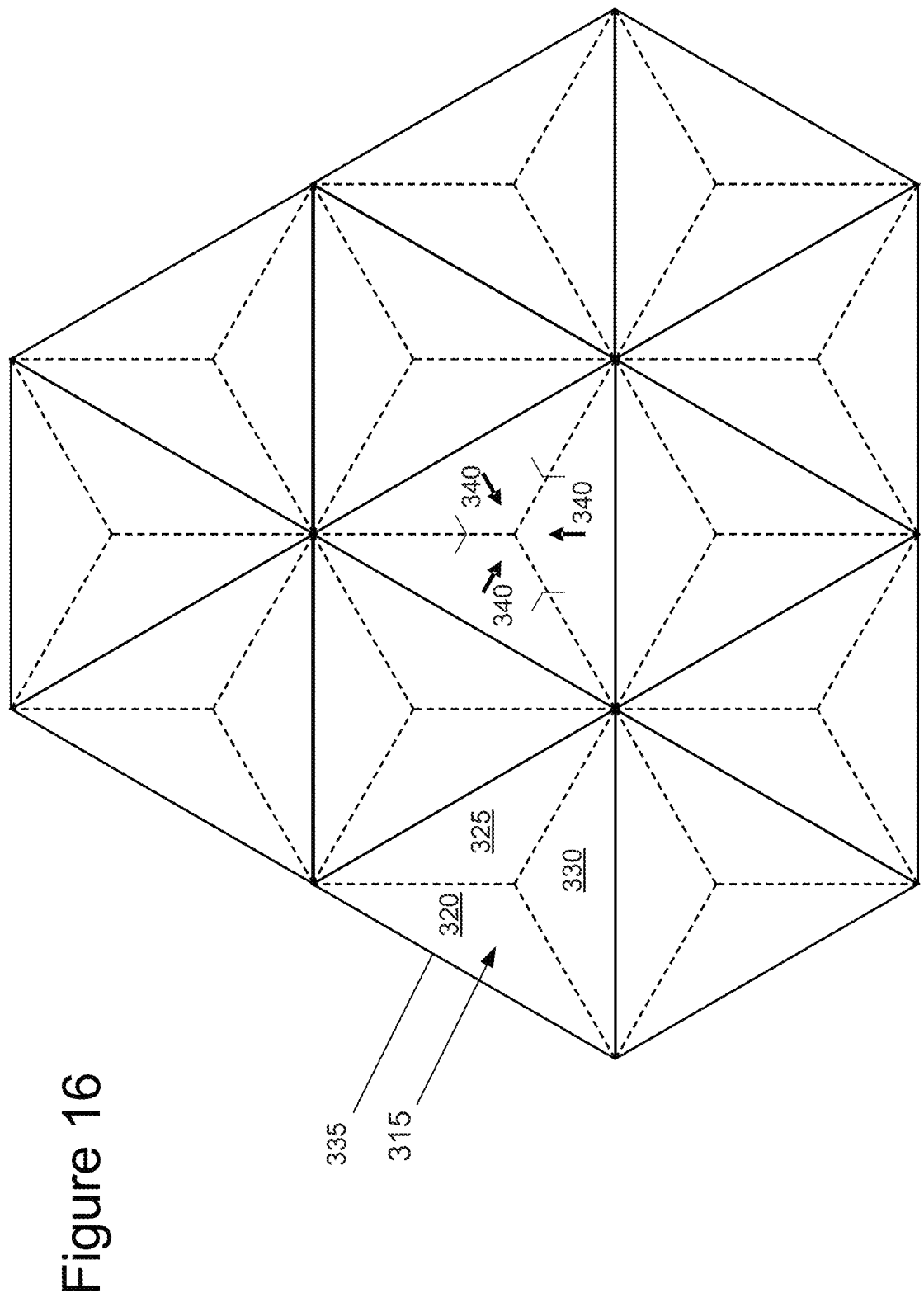

FIGS. 15 and 16 show other corner cube reflector forms, each having a slightly different arrangement of surfaces. In FIG. 15, the corner cube reflectors 280 include a plurality of pentagonal faces 285, 290, and 295 having outermost edges 300 defining a hexagonal opening. The faces 285, 290, and 295 slope into the page in the direction of arrows 305. Each face joins with its adjacent faces at interior angles of approximately 90°, within an application-dependent tolerance of $\theta_{error}$. In FIG. 16, the corner cube reflectors 315 include a plurality of triangular faces 320, 325, and 330 having respective outermost edges 335 defining a larger triangular opening. The faces 320, 325, and 330 slope into the page in the direction of arrows 340. Each face joins with its adjacent faces at interior angles of approximately 90°.

The ability of the reflector to retroreflect varies with the incidence angle of incoming radiation. Ideal square corner cube reflectors achieve 100% retroreflection at a zero incidence angle, whereas ideal triangular corner cube reflectors achieve about 66.7% retroreflection. Both such corner cube reflector types achieve at least 50% retroreflection up to an incidence angle of approximately 20 degrees. Pentagonal corner cube reflectors also provide 100% retroreflection at a zero incidence angle, but exhibit diminished performance at larger angles of incidence. To provide near-constant retroreflectance to the target, the cover 40 may be formed as a collection of identical sections with different orientations so radiation arrives at a variety of incidence angles.

The foregoing covering 40 may also be used and/or manufactured in different manners. For example, the covering 40 may be provided in a form that comprises a set of panels that are individually attached to the wall of an enclosure. For example, the covering 40 may be provided in the form of wall panels, siding, or other item typically used to construct the interior surfaces of an office building, a hangar, a factory, or the like. Still further, a variety of methods can be used to manufacture the covering 40, e.g., stamping sheet metal into the desired shape, hot-pressing sheets of aluminized plastic, or using plastic injection molding to make the structure and then depositing a reflective coating on it.

In the example shown in FIGS. 17A and 17B, the covering 40 is formed from a sheet of infrared-transparent material 400, such as germanium or high density polyethylene (HDPE). The back surface 405 of the sheet 400 comprises retroreflective elements 410, e.g., corner cube reflectors or troughs, and the front surface 415 of the sheet is substantially flat at scales corresponding to infrared wavelengths. A received infrared beam 420 enters the flat front surface 415 of the sheet 400, and is retroreflected by retroreflective elements 410 at the back surface 405, before exiting the flat front surface 415 of the sheet 400, where it departs along a path 425 having the same elevation angle and/or azimuth angle as the received beam 420.

In the example shown in FIGS. 18A and 18B, covering 40 is formed as a layer of infrared-transparent retroreflective spheres or cat's-eye reflectors 430, which are attached to a panel/substrate 435 with an adhesive 440. The reflectors 430 may include an infrared-reflective coating on their back surfaces 445. In these examples, retroreflection occurs in both elevation and azimuth, where the retroreflection is achieved by a combination of refraction at the front surface 450 and reflection at the back surface 445 of each sphere or cat's-eye reflector 430. The apertures of these retroreflectors 430 are governed by the same constraints as described above for corner cube reflectors. FIGS. 19A, 19B, and 19C show examples of covering 40 using a plurality of infrared-transparent prisms. In FIG. 19B, each of the plurality of infrared-transparent prisms 455 has a circular cross-section. The plurality of infrared-transparent prisms 460 shown in FIG. 19C are in the form of cat's eye reflectors. The plurality of infrared-transparent prisms may also have an intermediate shape between the circular shape of FIG. 19B and the cat's eye shape of FIG. 19C. As shown in these figures, the prisms are oriented parallel to each other and positioned adjacent each other. In this example, the covering 40 may, without limitation, be fabricated by extrusion or by one-directional milling of a flat sheet. An infrared reflective coating may be applied to the back surface 465 of each prism. Like the trough retroreflectors described above, each fiber or prism retroreflects an infrared beam about only one plane of symmetry. If a first geometric plane is defined that includes a received infrared beam 470 and the axis 473 of the fiber or prism, the reflected infrared beam 475 lies in substantially the same plane, e.g., if the axis 473 of the fiber or prism is horizontal and the received infrared beam arrives at a particular elevation angle, the reflected infrared beam departs along substantially the same elevation angle. Likewise if the axis 473 of the fiber or prism is vertical and the received infrared beam 470 arrives at a particular elevation angle, the reflected infrared beam 475 departs along substantially the same elevation angle.

Figure 20A:
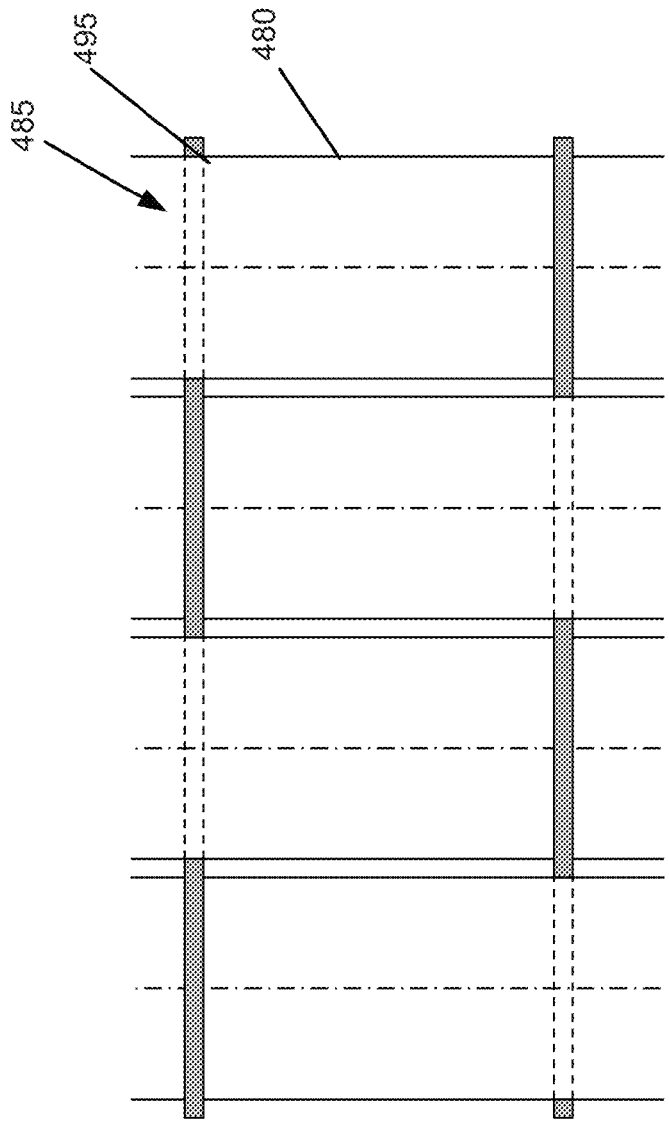
FIGS. 20A and 20B show a retroreflective infrared covering woven from infrared transparent fibers.
Figure 20B:
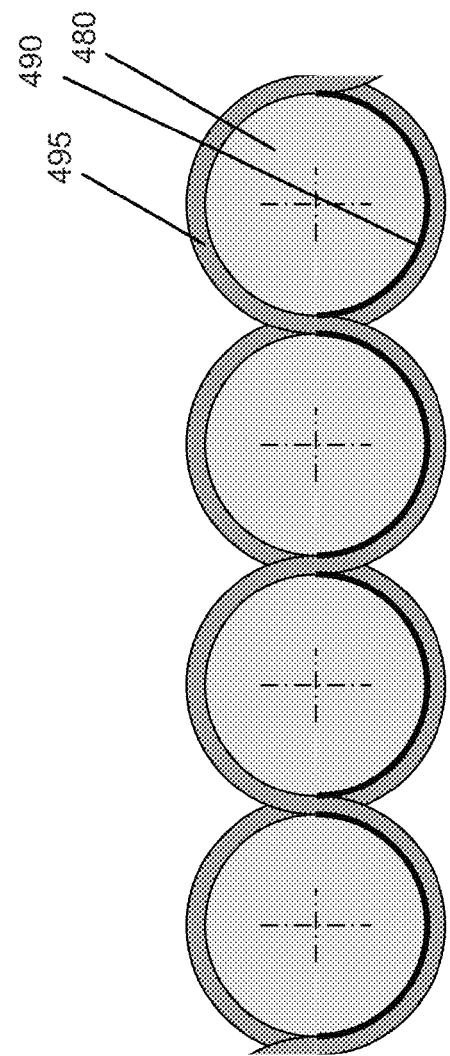

A still further example of covering 40 is shown in FIGS. 20A and 20B. Here, the covering 40 includes a plurality of infrared-transparent fibers 480, each with a cross-section shaped like a circle, that are woven into a retroreflective fabric 485. The fibers 480 may be oriented parallel to each other and attached to a substrate or, as shown in FIG. 20B, the fibers 480 may be woven into the fabric 485 so that they lie in roughly the same plane. An infrared reflective coating is applied to the back surface 490 of each fiber 480. Each fiber or prism retroreflects an infrared beam about only one plane of symmetry. The woven infrared-transparent fibers 480 may be linked together by cross-woven structural fibers 495 of other material, where the diameter and the spacing of the cross-woven structural fibers 495 may be chosen to block only a small fraction of infrared radiation arriving at covering 40. In this example the fibers 480 and/or 495 may, without limitation, be fabricated by extrusion or by pulling, and the covering 40 may, without limitation, be manufactured by weaving.

The invention claimed is:

1. An apparatus comprising:
   a covering having a plurality of retroreflective elements configured to retroreflect electromagnetic beams primarily at thermal infrared wavelengths,
   wherein the plurality of retroreflective elements are configured to receive electromagnetic beams from a target along beam reception paths and to reflect the electromagnetic beams back toward the target along beam reflection paths,
   wherein the beam reflection paths have substantially the same elevation angle and/or azimuth angle as their respective beam reception paths, and
   wherein the plurality of retroreflective elements includes a plurality of infrared transparent fibers, wherein each fiber comprises a first side and a second side, said first side coated with an infrared reflective coating, said second side not coated.

2. The apparatus claim 1, wherein the plurality of retroreflective elements include retroreflective elements configured to scatter audible sound wavelengths, wherein the scattering is one of diffusive or specular.

3. The apparatus of claim 2, wherein the plurality of retroreflective elements include retroreflective elements configured to scatter audible sound wavelengths that are in a range of about 17 mm to about 17 meters, wherein the scattering is one of diffusive or specular.

4. The apparatus of claim 1, wherein the plurality of retroreflective elements are configured to retroreflect electromagnetic beams at thermal infrared wavelengths primarily in a range between about 700 nm and about 0.5 mm, or sub-range thereof.

5. The apparatus of claim 4, wherein the plurality of retroreflective elements include retroreflective elements configured to retroreflect electromagnetic beams primarily at wavelengths between about approximately 8 microns and 12 microns.

6. The apparatus of claim 1, wherein the plurality of retroreflective elements include a plurality of corner cube reflectors.

7. The apparatus of claim 6, wherein the plurality of corner cube reflectors include corner cube reflectors having triangular openings to receive the electromagnetic beams.

8. The apparatus of claim 6, wherein the plurality of corner cube reflectors include corner cube reflectors having hexagonal openings to receive the electromagnetic beams.

9. The apparatus of claim 1, wherein the plurality of retroreflective elements include a plurality of troughs having reflective surfaces.

10. The apparatus of claim 9, wherein each trough comprises a first reflective surface and a second reflective surface, wherein the first and second reflective surfaces are arranged at an angle of about 90° with respect to one another.

11. The apparatus of claim 9, further comprising at least one reflective wall arranged adjacent at least one of the plurality of troughs.

12. The apparatus of claim 9, wherein at least one of the plurality of troughs are foldable about respective centerlines to facilitate portability of the plurality of troughs.

13. The apparatus of claim 1, wherein the elevation angles of the beam reception paths and the respective beam reflection paths are substantially the same, and the azimuth angles of the beam reflection paths and the respective beam reflection paths are substantially the same.

14. An apparatus comprising a covering including:
a plurality of corner cube reflector elements configured to reflect electromagnetic beams at wavelengths primarily at infrared wavelengths,
wherein the plurality of corner cube reflectors each include a plurality of pentagonal faces having outermost edges defining a hexagonal opening,
wherein the plurality of corner cube reflector elements receive the electromagnetic beams from a target along beam reception paths and reflect the electromagnetic beams back toward the target along beam reflection paths,
wherein the beam reflection paths have substantially the same elevation angles and/or azimuth angles as their respective beam reception paths, and
wherein the plurality of corner cube reflector elements include corner cube reflector elements having an effective aperture size corresponding to:

$$WR \geq 1.22 \frac{\lambda \Delta x}{W_T}$$

wherein $\lambda$ is an infrared wavelength of the electromagnetic beam, $\Delta x$ corresponds to a mean distance between the covering and the target and $W_T$ corresssponds to the mean with of the target.

15. The apparatus of claim 14, wherein the plurality of corner cube reflector elements are configured to retroreflect electromagnetic beams at wavelengths primarily in a range between about 700 nm and about 0.5 mm, or sub-range thereof.

16. The apparatus of claim 14, wherein the plurality of corner cube reflector elements includes corner cube reflector elements configured to retroreflect electromagnetic beams primarily in a range between wavelengths 8 microns and 12 microns.

17. The apparatus of claim 14, wherein the plurality of corner cube reflector elements include corner cube reflector elements having an effective aperture size dimensioned to scatter audible sound wavelengths, wherein the scattering is one of diffusive or specular.

18. A method for directing thermal infrared energy toward or away from a target, the method comprising:
placing a covering at a mean distance $\Delta x$ with respect to the target;
retroreflecting electromagnetic beams from the covering primarily at thermal infrared wavelengths, wherein the covering receives the electromagnetic beams along beam reception paths from the target and reflects the electromagnetic beams along beam reflection paths back to the target, wherein each beam reflection path has substantially the same elevation angles and/or azimuth angles as its respective beam reception path, the covering comprising a plurality of retroreflective elements, and
scattering acoustic energy at audible sound wavelengths from the covering, wherein the plurality of retroreflective elements are configured to scatter acoustic energy, wherein the scattering is one of diffusive or specular, and wherein each retroreflective element has an effective aperture specifically sized to retroreflect electromagnetic beams at primarily thermal infrared wavelengths and to scatter acoustic energy at audible sound wavelengths.

19. The method of claim 18, wherein the beam reception paths and the beam reflection paths have substantially the same elevation angle.

20. The method of claim 18, wherein the infrared wavelengths retroreflected by the covering are primarily between about 8 microns and 12 microns.

21. The method of claim 18, wherein the plurality of retroreflective elements includes a plurality of infrared transparent fibers, wherein each fiber comprises a first side and a second side, said first side coated with an infrared reflective coating, said second side not coated.

22. The method of claim 18, wherein the plurality of retroreflective elements include a plurality of troughs having reflective surfaces and at least one reflective wall arranged adjacent at least one of the plurality of troughs.

23. The method of claim 18, wherein the plurality of retroreflector elements each have an effective aperture size, $W_R$, corresponding to:

$$W_R \leq \frac{1.22 \lambda_s \Delta x}{W_T}$$

where $\lambda_s$ corresponds to the wavelength of the audible sound and $W_T$ corresponds to the mean width of the target.

* * * * *